United States Patent
Chen et al.

(10) Patent No.: US 12,472,644 B2
(45) Date of Patent: Nov. 18, 2025

(54) ADJUSTMENT MECHANISM, PICK-AND-PLACE SYSTEM, AND OPERATION METHOD THEREOF

(71) Applicant: INDUSTRIAL TECHNOLOGY RESEARCH INSTITUTE, Hsinchu (TW)

(72) Inventors: Yen-Cheng Chen, Taichung (TW); Jun-Yi Jiang, Nantou (TW); Guan-Wei Su, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 920 days.

(21) Appl. No.: 17/694,464

(22) Filed: Mar. 14, 2022

(65) Prior Publication Data

US 2023/0191625 A1 Jun. 22, 2023

(30) Foreign Application Priority Data

Dec. 21, 2021 (TW) .................................. 110147946

(51) Int. Cl.
*B25J 15/00* (2006.01)
*B25J 9/16* (2006.01)

(52) U.S. Cl.
CPC ......... *B25J 15/0028* (2013.01); *B25J 9/1697* (2013.01)

(58) Field of Classification Search
CPC .... B25J 15/0028; B25J 9/1015; B25J 9/1697; B65G 47/907; B65G 47/74; B65G 47/905
See application file for complete search history.

(56) References Cited

U.S. PATENT DOCUMENTS

| | | | |
|---|---|---|---|
| 4,648,771 A | 3/1987 | Yoshioka |
| 5,791,867 A | 8/1998 | Kuhl |
| 7,181,314 B2 | 2/2007 | Zhang |
| 9,457,479 B2 | 10/2016 | Usami |
| 9,576,832 B2 | 2/2017 | Tomida |
| 10,081,501 B2 | 9/2018 | Omiya |

(Continued)

FOREIGN PATENT DOCUMENTS

| CN | 102742378 A | * 10/2012 | ......... H05K 13/0404 |
|---|---|---|---|
| CN | 105083978 B | 11/2015 | |

(Continued)

OTHER PUBLICATIONS

TW Office Action in application No. 110147946 dated Jun. 29, 2023.

*Primary Examiner* — Emmanuel M Marcelo
(74) *Attorney, Agent, or Firm* — Maschoff Brennan

(57) ABSTRACT

A pick-and-place system includes a movement mechanism, an adjustment mechanism, and a clamping mechanism. The adjustment mechanism includes a first coupling component, a second coupling component, and a driving assembly. The first coupling component is mounted on the movement mechanism. The second coupling component is movably disposed on the first coupling component. The driving assembly is configured to be connected to the first coupling component and the second coupling component so as to force the first coupling component and the second coupling component to move relative to each other. The clamping mechanism is mounted on the second coupling component of the adjustment mechanism.

19 Claims, 20 Drawing Sheets

(56) References Cited

U.S. PATENT DOCUMENTS

| | | | |
|---|---|---|---|
| 10,913,166 B1* | 2/2021 | Rohl | B25J 15/10 |
| 10,940,999 B2 | 3/2021 | Kalouche | |
| 2007/0248446 A1* | 10/2007 | Wildner | B65G 61/00 |
| | | | 414/788 |
| 2017/0356167 A1* | 12/2017 | Paul | B25J 15/024 |
| 2020/0306964 A1 | 10/2020 | Neville et al. | |
| 2021/0114826 A1 | 4/2021 | Simon et al. | |
| 2021/0178583 A1* | 6/2021 | Ye | G06T 7/60 |
| 2022/0324658 A1* | 10/2022 | Cedarleaf-Pavy | |
| | | | B65G 47/8823 |

FOREIGN PATENT DOCUMENTS

| | | | | |
|---|---|---|---|---|
| CN | 107963451 A | * | 4/2018 | |
| CN | 208132989 U | | 11/2018 | |
| CN | 109434536 A | * | 3/2019 | B23Q 5/58 |
| CN | 110683343 A | | 1/2020 | |
| CN | 111699581 A | * | 9/2020 | H01M 10/0404 |
| CN | 112009920 A | | 12/2020 | |
| CN | 212831570 U | | 3/2021 | |
| TW | 582030 B | | 4/2004 | |
| TW | M279588 | | 11/2005 | |
| TW | I670223 B | | 9/2019 | |
| WO | WO-2008134041 A1 | * | 11/2008 | H01L 21/68707 |

\* cited by examiner

ADJUSTMENT MECHANISM, PICK-AND-PLACE SYSTEM, AND OPERATION METHOD THEREOF

CROSS-REFERENCE TO RELATED APPLICATIONS

This non-provisional application claims priority under 35 U.S.C. § 119(a) on Patent Application No(s). 110147946 filed in Taiwan, R.O.C. on Dec. 21, 2021, the entire contents of which are hereby incorporated by reference.

TECHNICAL FIELD

The disclosure relates to an adjustment mechanism, a pick-and-place system having the adjustment mechanism, and an operation method thereof.

BACKGROUND

Before shipping, packaged products, such as food, beverage, and so on can be stored in boxes or containers being stacked on pallets in a columnar manner.

It is found that either the box or container for storing packaged products are slightly different in size due to manufacturing errors or may be easily deformed or damaged during transportation. This may cause an unstable stacking of the boxes or containers so that the boxes or containers will easily fall down during transportation.

SUMMARY

The disclosure provides an adjustment mechanism, a pick-and-place system, and an operation method.

One embodiment of the disclosure provides a pick-and-place system. The pick-and-place system includes a movement mechanism, an adjustment mechanism, and a clamping mechanism. The adjustment mechanism includes a first coupling component, a second coupling component, and a driving assembly. The first coupling component is mounted on the movement mechanism. The second coupling component is movably disposed on the first coupling component. The driving assembly is configured to be connected to the first coupling component and the second coupling component so as to force the first coupling component and the second coupling component to move relative to each other. The clamping mechanism is mounted on the second coupling component of the adjustment mechanism.

Another embodiment of the disclosure provides an adjustment mechanism configured to be mounted on a movement mechanism. The adjustment mechanism includes a first coupling component, a second coupling component, and a driving assembly. The first coupling component is configured to be mounted on the movement mechanism. The second coupling component is movably disposed on the first coupling component. The driving assembly includes a shaft, a first pushing component, and a rotation-driving component. The shaft is rotatably disposed on the first coupling component. The first pushing component is rotatable with the shaft and in contact with the first coupling component or the second coupling component for forcing the first coupling component and the second coupling component to move relative to each other. The rotation-driving component is connected to the shaft and is configured to rotate the shaft relative to the first coupling component.

Still another embodiment of the disclosure provides an operating method of a pick-and-place system. The operating method includes:

using a clamping mechanism to pick up an object to a top of another object;

moving the clamping mechanism a first distance which is smaller than a depth that the object is fully-engaged with the another object along a first direction to partially engage the object with the another object;

moving the clamping mechanism along a second direction which is perpendicular to the first direction to force the object to move the another object along the second direction; and moving the clamping mechanism a second distance along the first direction to fully-engage the object with the another object;

wherein a sum of the first distance and the second distance is substantially equal to the depth that the object is fully-engaged with the another object.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
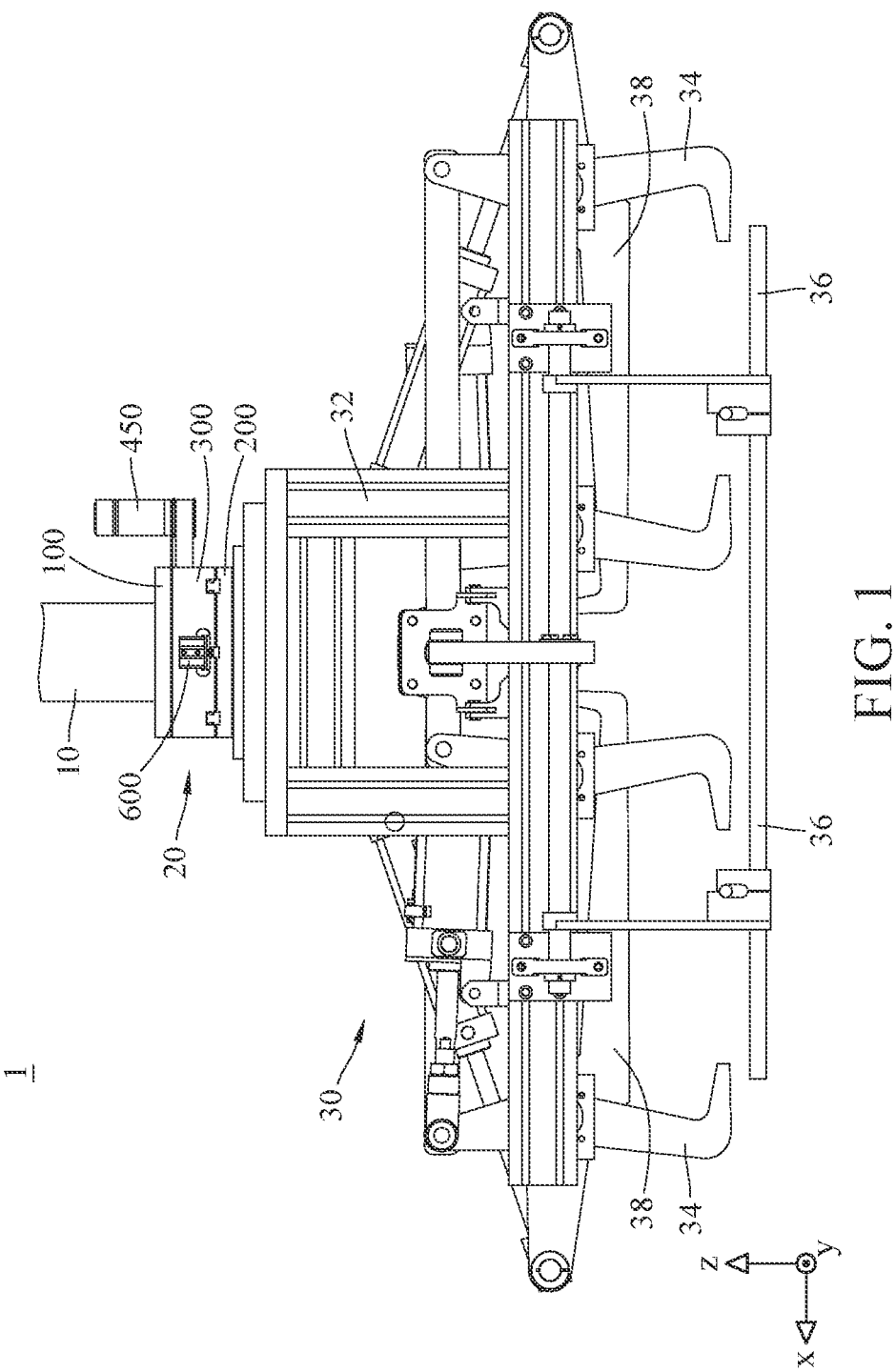
FIG. 1 is a schematic view of a pick-and-place system according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
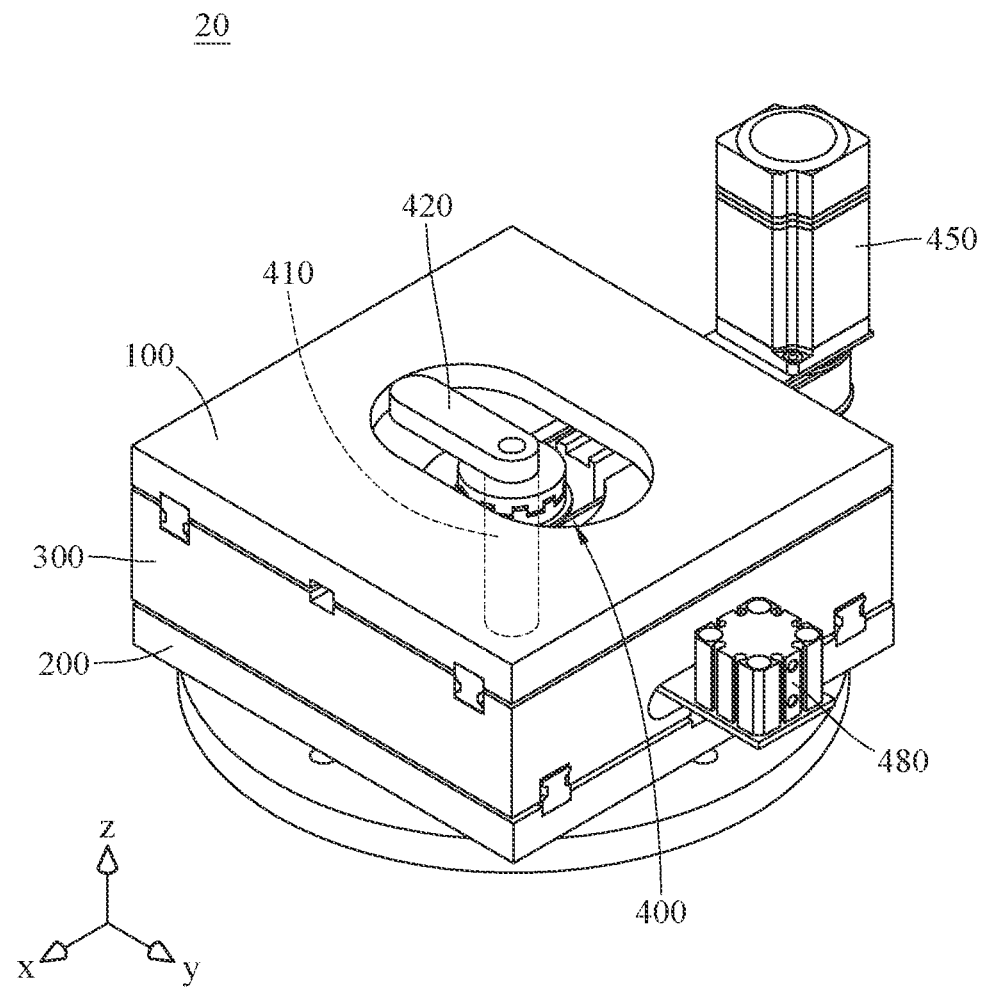
FIG. 2 is a perspective view of an adjustment mechanism in FIG. 1.
Figure 3:
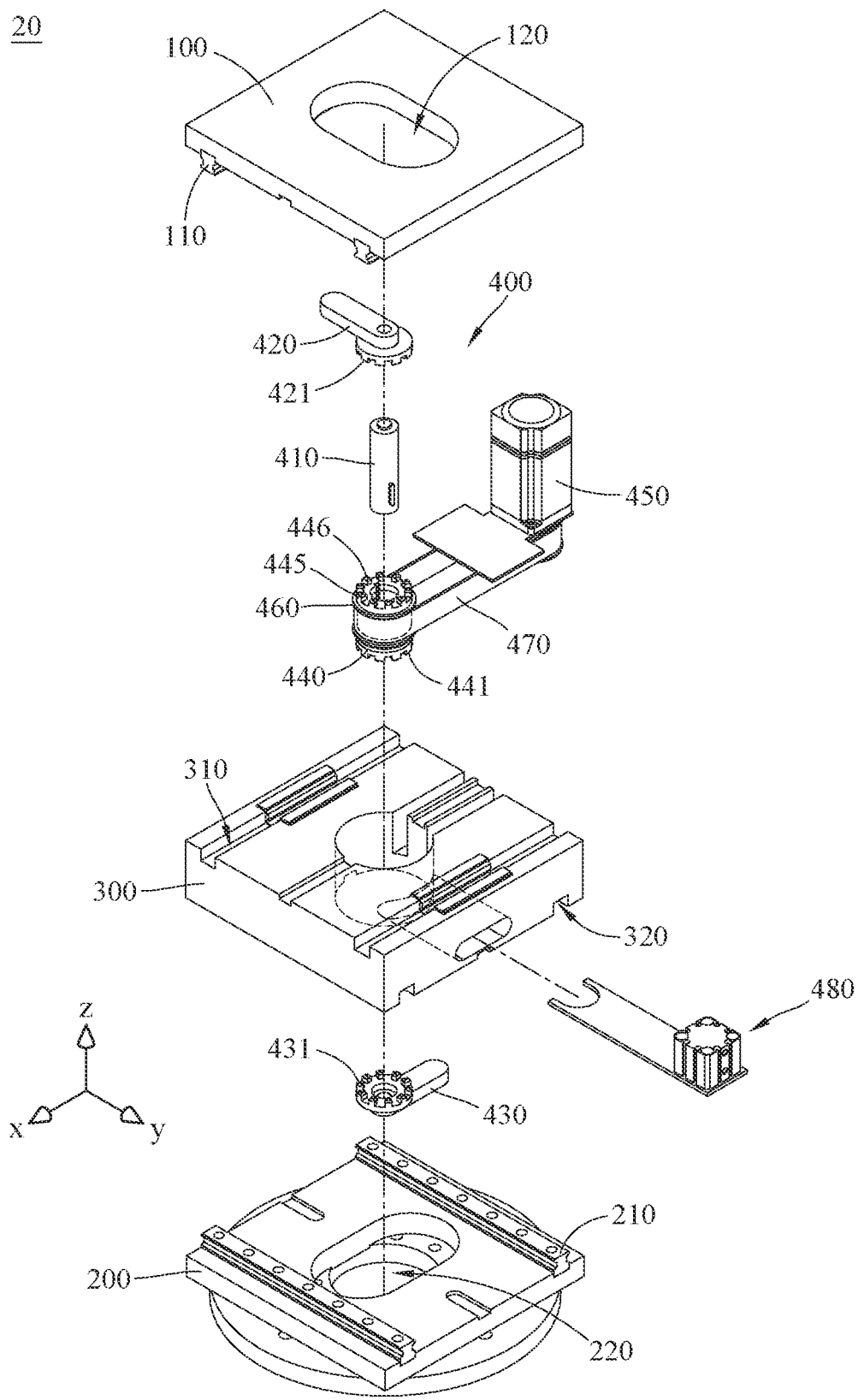
FIG. 3 is an exploded view of the adjustment mechanism in FIG. 2.
Figure 4:
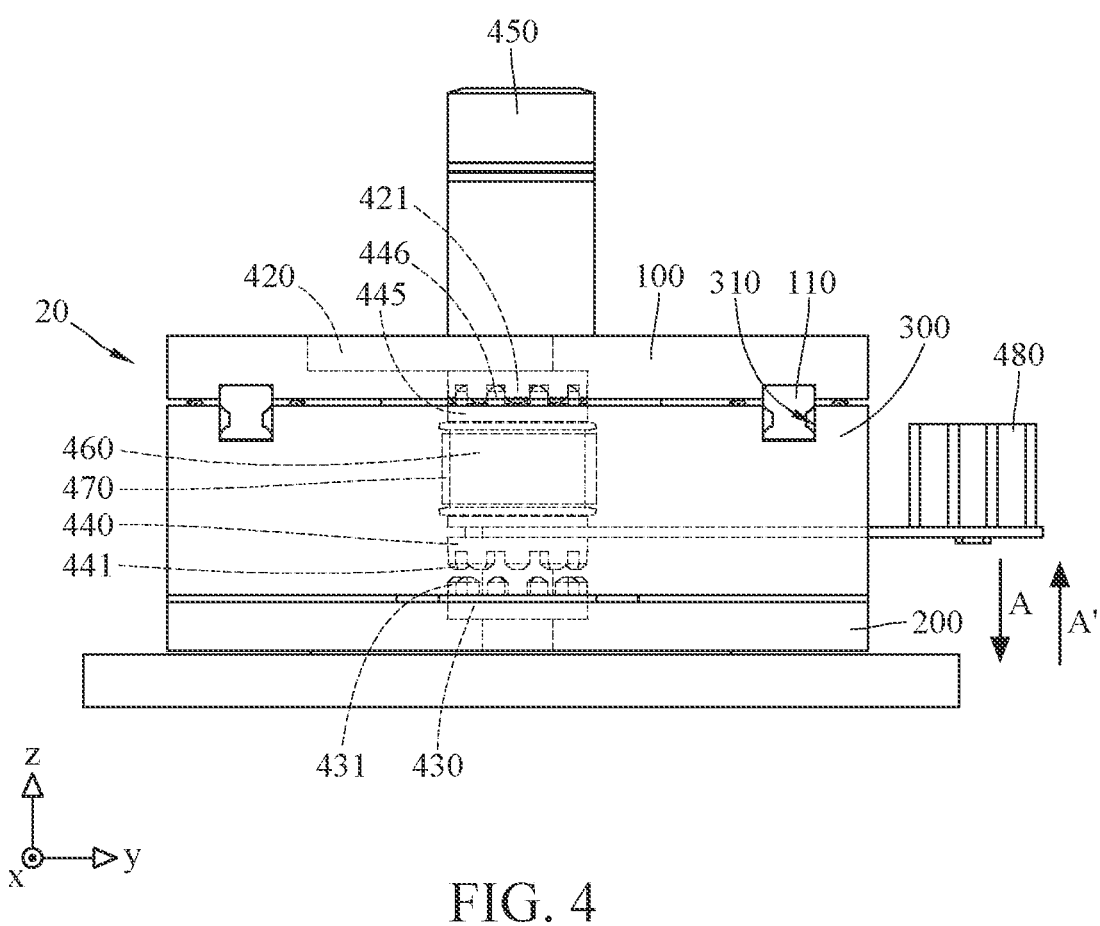
FIG. 4 is a side view of the adjustment mechanism in FIG. 2.

Referring to FIGS. 1 to 4, FIG. 1 is a schematic view of a pick-and-place system 1 according to a first embodiment of the disclosure, FIG. 2 is a perspective view of an adjustment mechanism 20 in FIG. 1, FIG. 3 is an exploded view of the adjustment mechanism 20 in FIG. 2, and FIG. 4 is a side view of the adjustment mechanism 20 in FIG. 2.

In this embodiment, the pick-and-place system 1 includes a movement mechanism 10, an adjustment mechanism 20, and a clamping mechanism 30. The movement mechanism 10 is a three-axis robotic arm which can operate along three axes or a six-axis robotic arm which can operate along six axes.

The adjustment mechanism 20 includes a first coupling component 100, a second coupling component 200, a base component 300, and a driving assembly 400. The first coupling component 100 is mounted on the movement mechanism 10 via, for example, screws, such that the first coupling component 100 can be moved along with the movement mechanism 10. The base component 300 is slidably disposed on the first coupling component 100, and the second coupling component 200 is slidably disposed on the base component 300. A slidable direction of the base component 300 relative to the first coupling component 100 is different from a slidable direction of the second coupling component 200 relative to the base component 300. Specifically, the first coupling component 100 has a plurality of first guide rails 110. The base component 300 has a plurality of first guide grooves 310 and a plurality of second guide grooves 320 respectively located at two opposite sides of the base component 300. The second coupling component 200 has a plurality of second guide rails 210. The first guide rails 110 of the first coupling component 100 are assembled with the first guide grooves 310 of the base component 300, such that the first coupling component 100 and the base component 300 are slidable relative to each other along an X-axis direction. The second guide rails 210 of the second coupling component 200 are assembled with the second guide grooves 320 of the base component 300, such that the second coupling component 200 and the base component 300 are slidable relative to each other along a Y-axis direction. In addition, the first coupling component 100 has a first hole 120, and the second coupling component 200 has a second hole 220. A cross section of the first hole 120 and a cross section of the second hole 220 are in an oval shape, and the purposes of the first hole 120 and the second hole 220 will be introduced later.

The driving assembly 400 may have a power source (e.g., a pneumatic cylinder or a motor) for driving the first coupling component 100 and the base component 300 to move relative to each other or driving the second coupling component 200 and the base component 300 to move relative to each other. In this embodiment, the power source of the driving assembly 400 is a motor. Specifically, the driving assembly 400 includes a shaft 410, a first pushing component 420, a second pushing component 430, two clutches 440 and 445, a rotation-driving component 450, a transmission wheel 460, a transmission belt 470 and a linear movement driving component 480. The shaft 410 is rotatably disposed on the first coupling component 100. The first pushing component 420 is fixed to one end of the shaft 410 and located in the first hole 120 of the first coupling component 100. The first pushing component 420 has an oval shape, and a length of the first pushing component 420 is, for example, equal to a width of the first hole 120 and smaller than a length of the first hole 120. The first pushing component 420 is rotatable with the shaft 410 and is in contact with an inner surface of the first coupling component 100 surrounding the first hole 120 for driving the first coupling component 100 and the base component 300 to slide along the X-axis direction relative to each other. The second pushing component 430 is fixed to another end of the shaft 410 and located in the second hole 220 of the second coupling component 200. The second pushing component 430 has an oval shape, and a length of the second pushing component 430 is, for example, equal to a width of the second hole 220 and smaller than a length of the second hole 220. The second pushing component 430 is rotatable with the shaft 410 and is in contact with an inner surface of the second coupling component 200 surrounding the second hole 220 for driving the second coupling component 200 and the base component 300 to slide along the Y-axis direction relative to each other.

The clutch 440 has a first engagement structure 441, and the clutch 445 has a first engagement structure 446. The first pushing component 420 has a second engagement structure 421, and the second pushing component 430 has a second engagement structure 431. The clutches 440 and 445 are slidably disposed on the shaft 410 and are rotatable with the shaft 410 so as to be rotatable relative to the first coupling component 100. The clutches 440 and 445 are movable along an axis of the shaft 410, such that the first engagement structure 446 can be engaged with the second engagement structure 421, or the first engagement structure 441 can be engaged with the second engagement structure 431.

The transmission wheel 460 is located between the clutches 440 and 445 and can drive the shaft 410 to rotate. In this embodiment, the transmission wheel 460 can be moved along with the clutches 440 and 445 in the axis of the shaft 410. The rotation-driving component 450 is, for example, a motor. The transmission belt 470 is sleeved on an output wheel of the rotation-driving component 450 and the transmission wheel 460, such that the rotation-driving component 450 can drive the shaft 410 to rotate relative to the first coupling component 100 via the transmission belt 470 and the transmission wheel 460.

The linear movement driving component 480 is, for example, a pneumatic cylinder. The linear movement driving component 480 is connected to the clutches 440 and 445 for moving the clutches 440 and 445 along the axis of the shaft 410 (e.g., a direction A or A' shown in FIG. 4) to engage/disengage the first engagement structure 446 of the clutch 445 with/from the second engagement structure 421, or to engage/disengage the first engagement structure 441 of the clutch 440 with/from the second engagement structure 431. When the first engagement structure 446 of the clutch 445 is engaged with the second engagement structure 421 of the first pushing component 420, the shaft 410 rotates the first pushing component 420 relative to the first coupling component 100 via the clutch 445, and the first coupling component 100 is pressed by the first pushing component 420 so as to move the base component 300 and the second coupling component 200 along the X-axis direction. When the first engagement structure 441 of the clutch 440 is engaged with the second engagement structure 431 of the second pushing component 430, the shaft 410 rotates the second pushing component 430 relative to the second coupling component 200 via the clutch 440, and the second coupling component 200 is pushed by the second pushing component 430 to move relative to the base component 300 and the first coupling component 100 along the Y-axis direction. In this embodiment, the direction A is the negative Z-axis direction, and the direction A' is the positive Z-axis direction.

Note that the arrangements of the guide rails of the first coupling component 100 and the guide grooves of the base component 300 are not restricted in the disclosure and may be modified as required; in some other embodiments, the base component may have guide rails, and the first coupling component may have guide grooves.

In this embodiment, the first coupling component 100 and the base component 300 are slidable relative to each other via the guide rails and the guide grooves mating each other, but the present disclosure is not limited thereto; in some other embodiments, the first coupling component and the base component may be slidable relative to each other via other suitable components, such as balls disposed therebetween.

Figure 20:
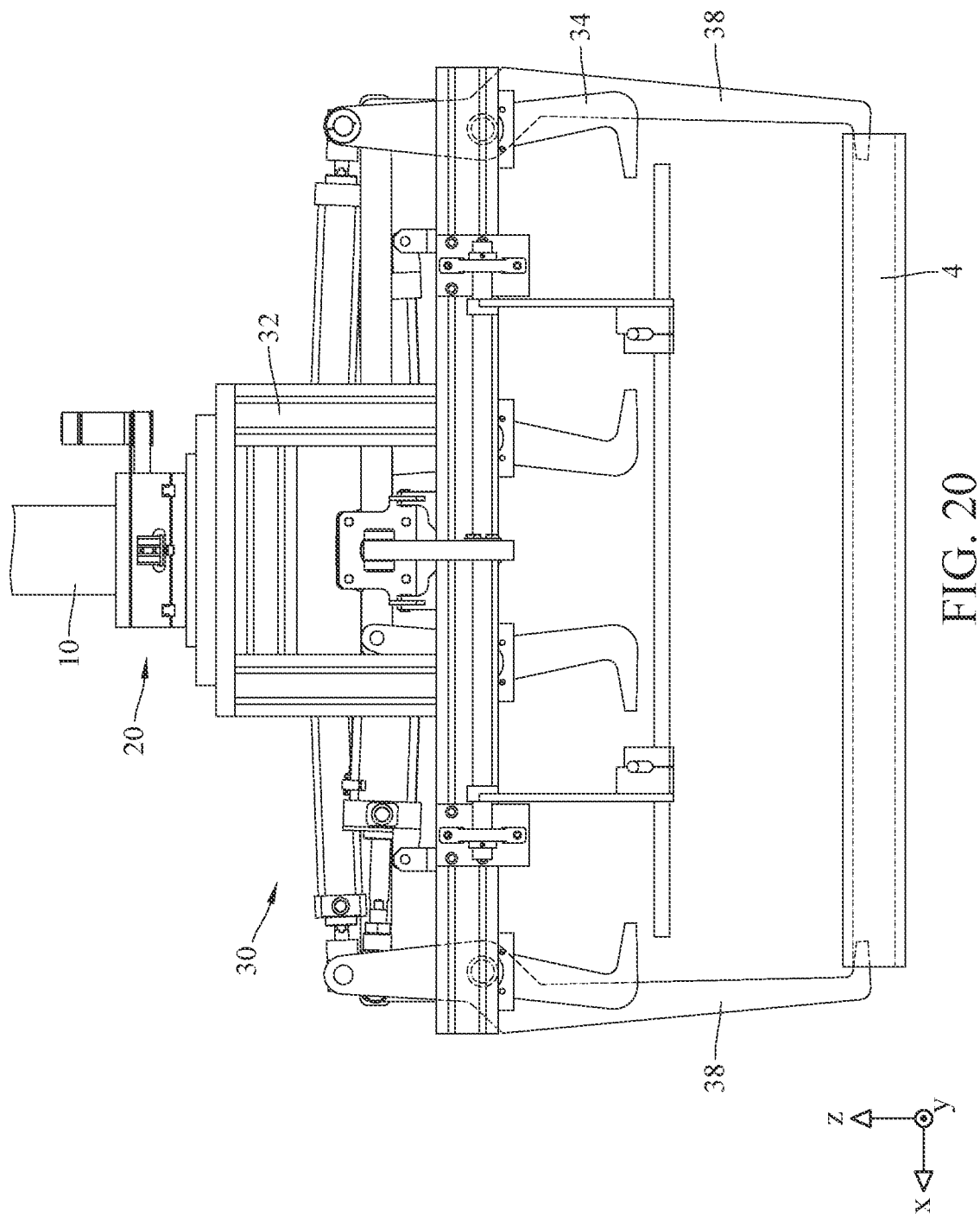
FIG. 20 shows the pick-and-place system in FIG. 1 when picking up a pallet.
Figure 21:
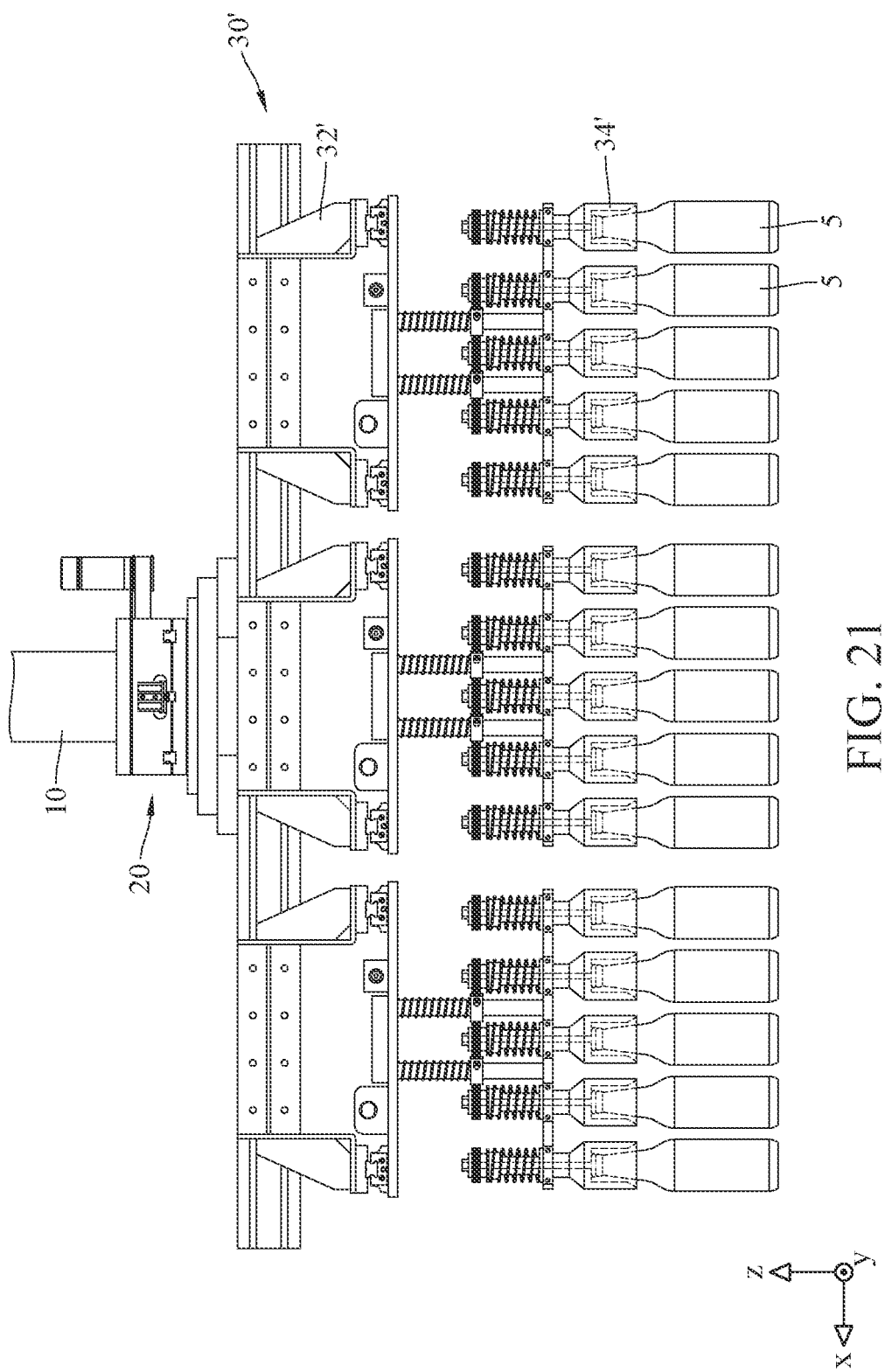
FIG. 21 is a schematic view of a pick-and-place system according to a second embodiment of the disclosure when picking up beverage bottles.

As shown in FIG. 1, the clamping mechanism 30 is mounted on the second coupling component 200 of the adjustment mechanism 20 via screws, and the clamping mechanism 30 can pick up a pallet 4 (shown in FIG. 20), containers 2 (shown in FIG. 5) or beverage bottles 5 (shown in FIG. 21). Specifically, the clamping mechanism 30 includes a support 32 and a plurality of first movable hooks 34. The support 32 is fixed to the second coupling component 200. The first movable hooks 34 are pivotably disposed on the support 32 and are configured to be hooked on the containers 2.

In this embodiment, the clamping mechanism 30 may further include a plurality of contact components 36. The contact components 36 are rotatably disposed on the support 32 for clamping the containers 2.

In this embodiment, the clamping mechanism 30 may further include a plurality of second movable hooks 38. The second movable hooks 38 are pivotably disposed on the support 32, and a length of each of the second movable hooks 38 are larger than a length of each of the first movable hooks 34. The second movable hooks 38 are configured to be hooked on the pallet 4.

In this embodiment, the adjustment mechanism 20 includes three slidable components (i.e., the first coupling component 100, the base component 300, and the second coupling component 200), such that the adjustment mechanism 20 enable the clamping mechanism 30 to be movable along two axis directions (i.e., the X-axis direction and the Y-axis direction), but the present disclosure is not limited thereto; in some other embodiments, the adjustment mechanism may include only two slidable components (e.g., the first coupling component and the base component, the base component and the second coupling component, or the first coupling component and the second coupling component) to enable the clamping mechanism to be only movable in one axis direction.

In this embodiment, the quantity of the rotation-driving component 450 is one, and the rotation-driving component 450 can drive the first pushing component 420 by engaging the first pushing component 420 with the clutch 445, and can move the second pushing component 430 by engaging the second pushing component 430 with the clutch 440, but the present disclosure is not limited thereto; in some other embodiments, the clutches may be omitted, and the first pushing component and the second pushing component may be respectively moved by two rotation-driving components.

Then, the following paragraphs will introduce an operating method of the pick-and-place system 1. The method for operating the pick-and-place system 1 includes the following steps.

The first step is to use the clamping mechanism 30 to pick up an object and move it to the top of another object.

The second step is to move the clamping mechanism 30 a first distance which is shorter than a depth that these two objects are supposed to be fully-engaged with each other along a first direction to partially engage the object with the another object.

The third step is to move the clamping mechanism 30 along a second direction perpendicular to the first direction so as to force the object to move the another object along the second direction.

The fourth step is to move the clamping mechanism 30 along a third direction perpendicular to the first direction and the second direction so as to force the object to move the another object along the third direction.

The fifth step is to move the clamping mechanism 30 a second distance along the first direction so as to make these two objects fully-engaged with each other. It is understood that the sum of the first distance and the second distance is substantially equal to the depth that these two objects are supposed to be fully-engaged with each other. Specifically, referring to FIGS. 5 to 19, FIGS. 5 to 19 show the operation of the pick-and-place system 1 in FIG. 1 when stacking containers 2.

Figure 5:
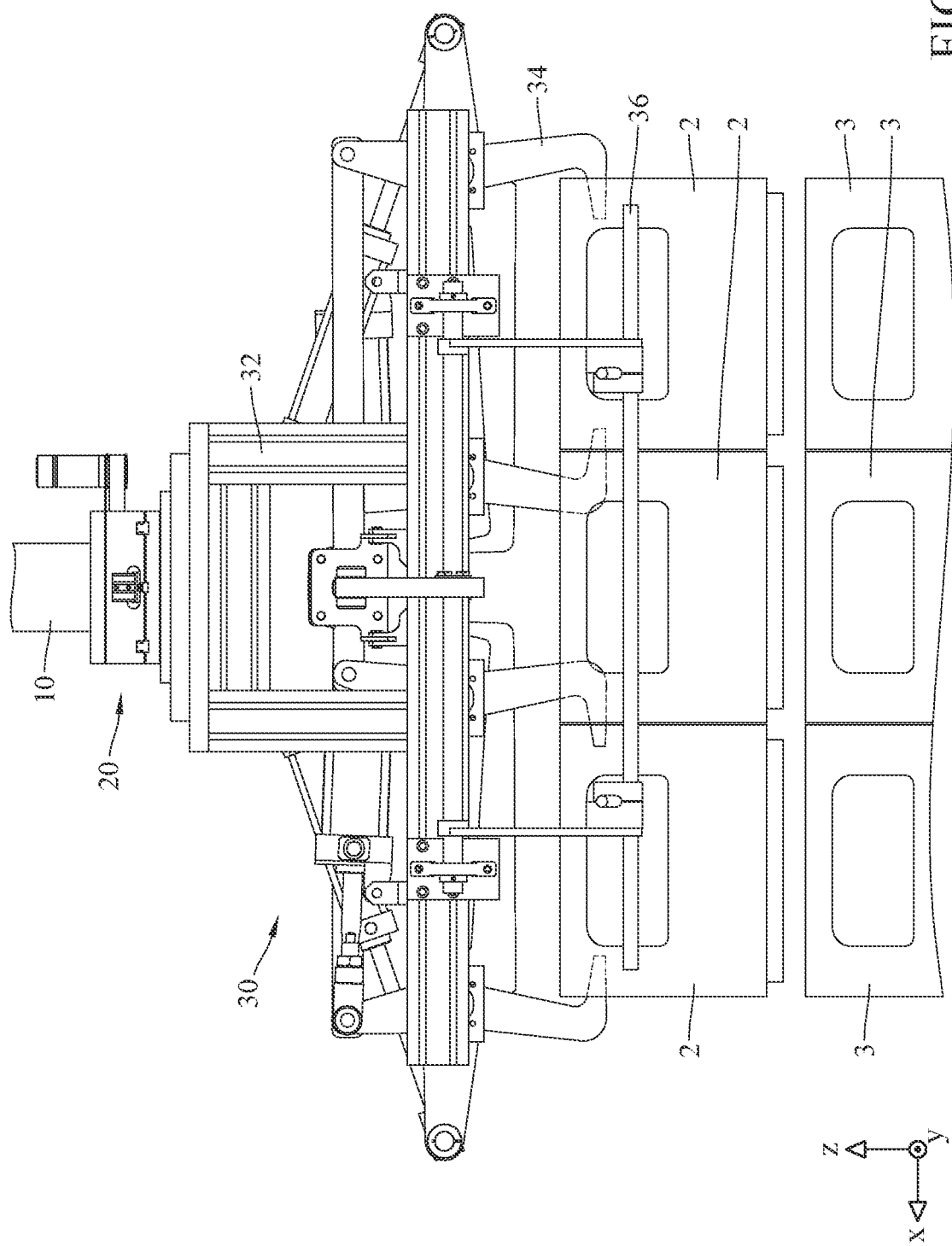
FIGS. 5 to 19 show the operation of the pick-and-place system in FIG. 1 when stacking containers.

As shown in FIG. 5, the first movable hooks 34 of the clamping mechanism 30 hook on a row of the containers 2, and the contact components 36 of the clamping mechanism 30 clamp the row of the containers 2, and then the movement mechanism 10 moves the row of the containers 2 hooked up by the clamping mechanism 30 to the top of a row of containers 3.

Figure 6:
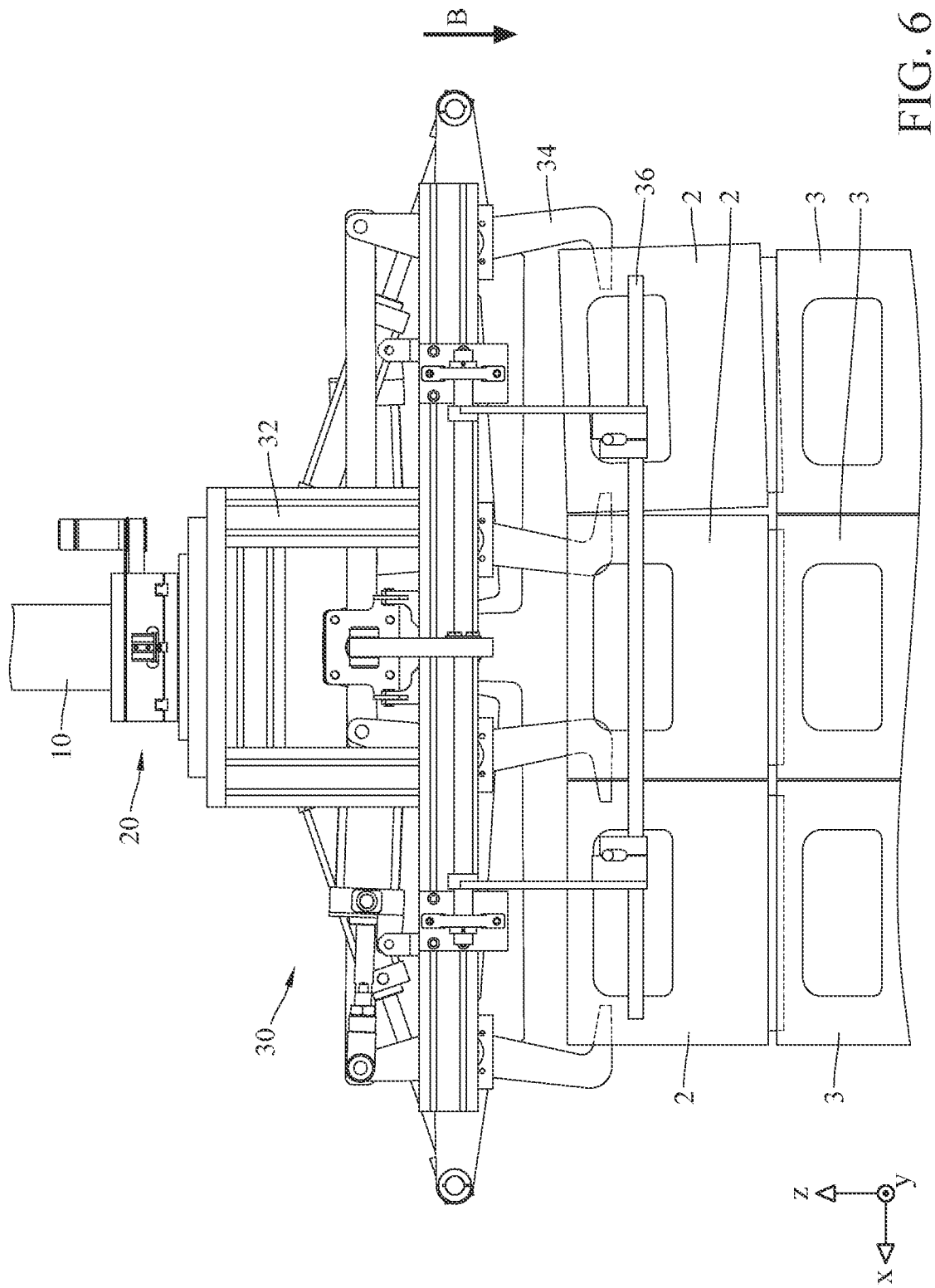

Then, as shown in FIG. 6, the movement mechanism 10 moves the clamping mechanism 30 a first distance along the first direction (e.g., a direction B), where the first distance is shorter than a depth that one of the containers 2 and one of the containers 3 are supposed to be fully-engaged with each other. In some cases, the container 2 and the container 3 may have a slight difference in size, or the containers 2 and 3 may be deformed during transportation, thus, after the movement mechanism 10 moves the clamping mechanism 30 the first distance along the first direction (e.g., a direction B), there may be one or more of the containers 2 not be able to be aligned and engaged with the respective containers 3. In this embodiment, the direction B is the negative Z-axis direction.

Figure 7:
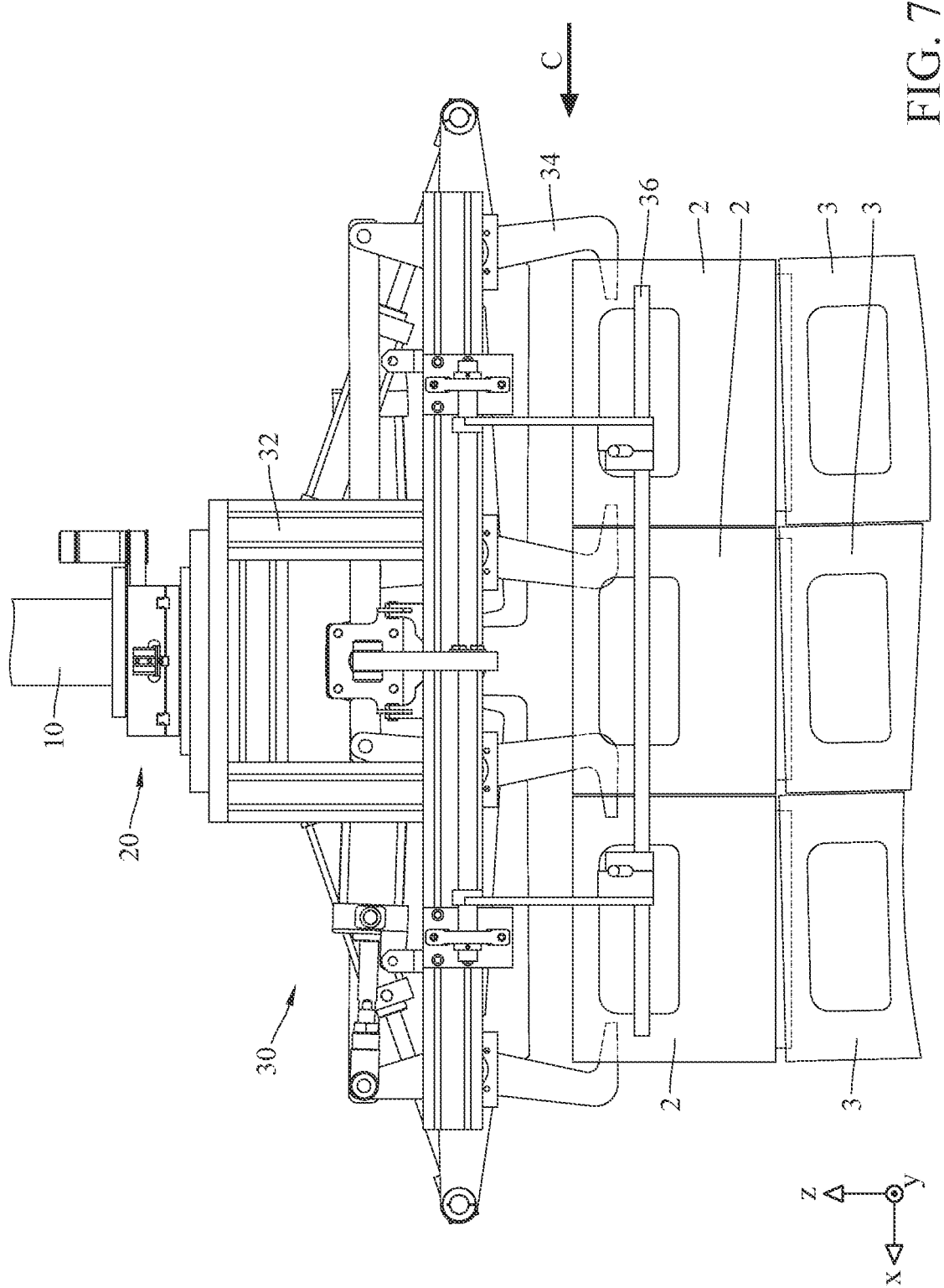

Then, as shown in FIG. 7, the clamping mechanism 30 is moved along the second direction (e.g., a direction C). During the movement of the clamping mechanism 30 along the second direction, the containers 2 and 3 which are partially engaged with each other can be moved together, while the container 2 which is not aligned or engaged with the respective container 3 can be moved relative to it, making it possible to realign the container 2 with the respective container 3. By doing so, the containers 2 may be respectively aligned with the containers 3. In this embodiment, the direction C is the positive X-axis direction.

Figure 8:
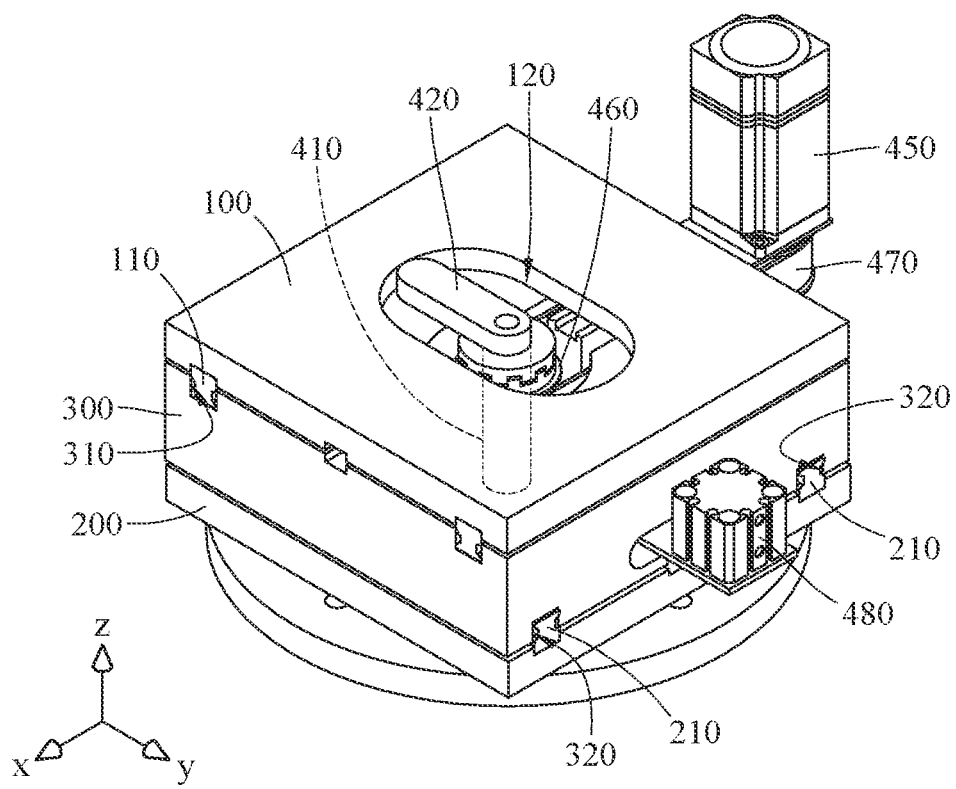
Figure 9:
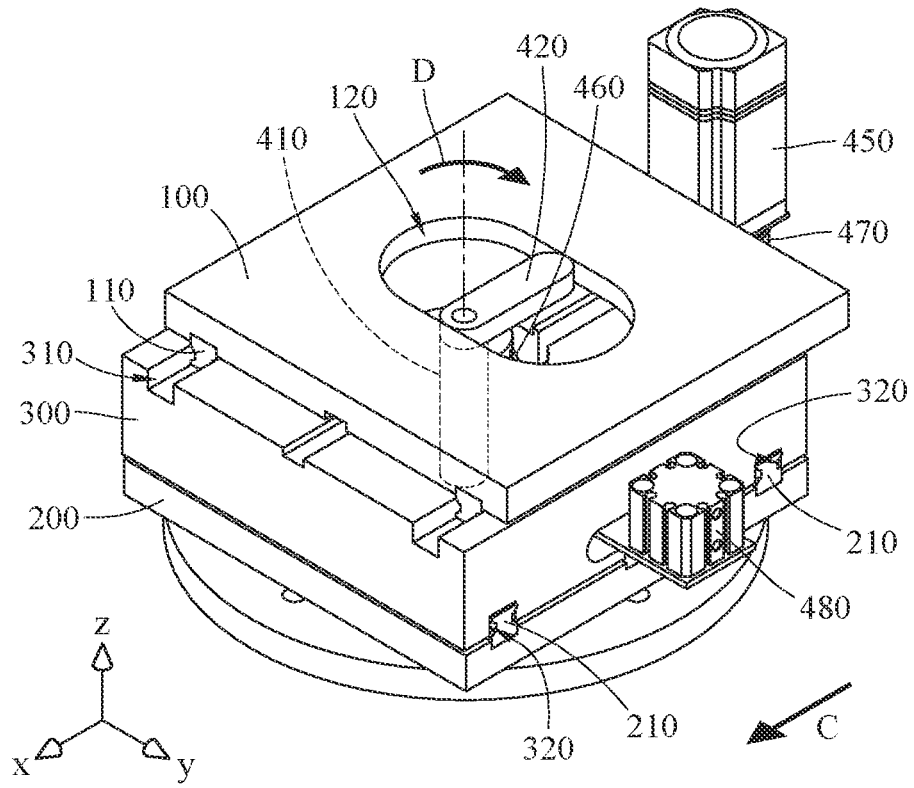
Figure 10:
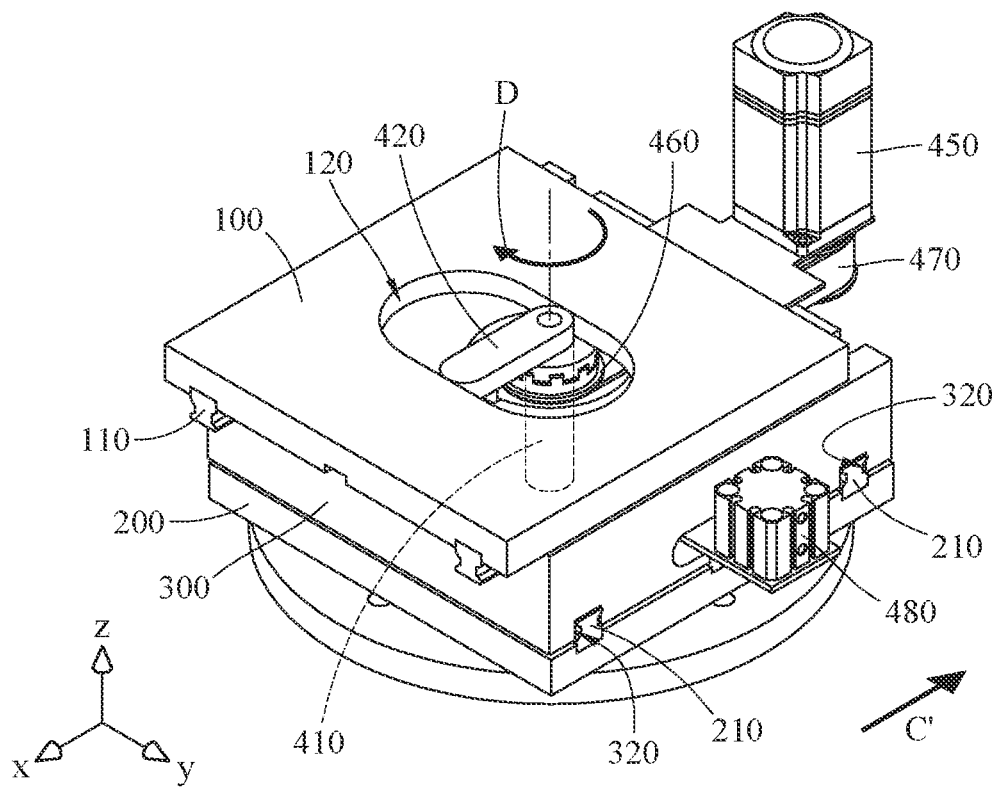
Figure 11:
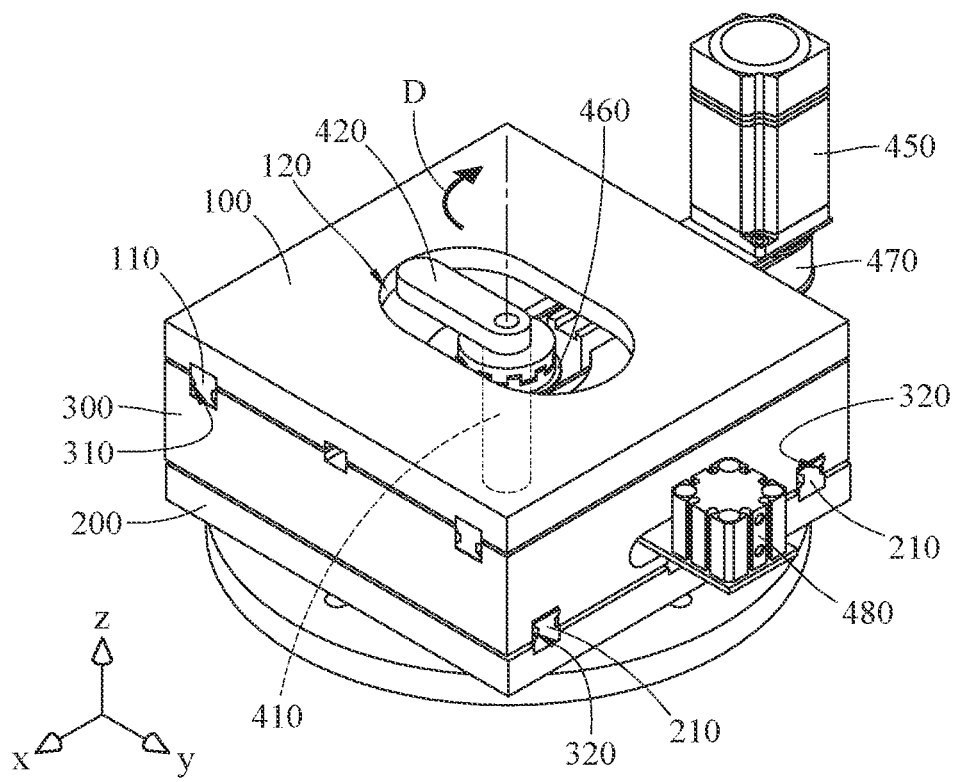

Then, the movement of the clamping mechanism 30 along the second direction (e.g., the direction C shown in FIG. 9) will be introduced. The first engagement structure 446 of the clutch 445 is firstly engaged with the second engagement structure 421 of the first pushing component 420. As shown in FIGS. 8 and 9, the rotation-driving component 450 rotates the first pushing component 420 along a direction D via the shaft 410, and the first coupling component 100 is pressed by the first pushing component 420, such that the base component 300 is forced to move relative to the first coupling component 100 along the second direction (e.g., the direction C). Then, as shown in FIGS. 10, the rotation-driving component 450 keeps rotating the first pushing component 420 along the direction D, such that the first pushing component 420 forces the base component 300 to move relative to the first coupling component 100 along a direction (e.g., a direction C') opposite to the second direction. Then as shown in FIG. 11, the first pushing component 420 returns back to its original position (e.g., the same position as shown in FIG. 8), and the clamping mechanism 30 is forced to move back to its original position. In this embodiment, the direction C is the positive X-axis direction, and the direction C' is the negative X-axis direction.

Figure 12:
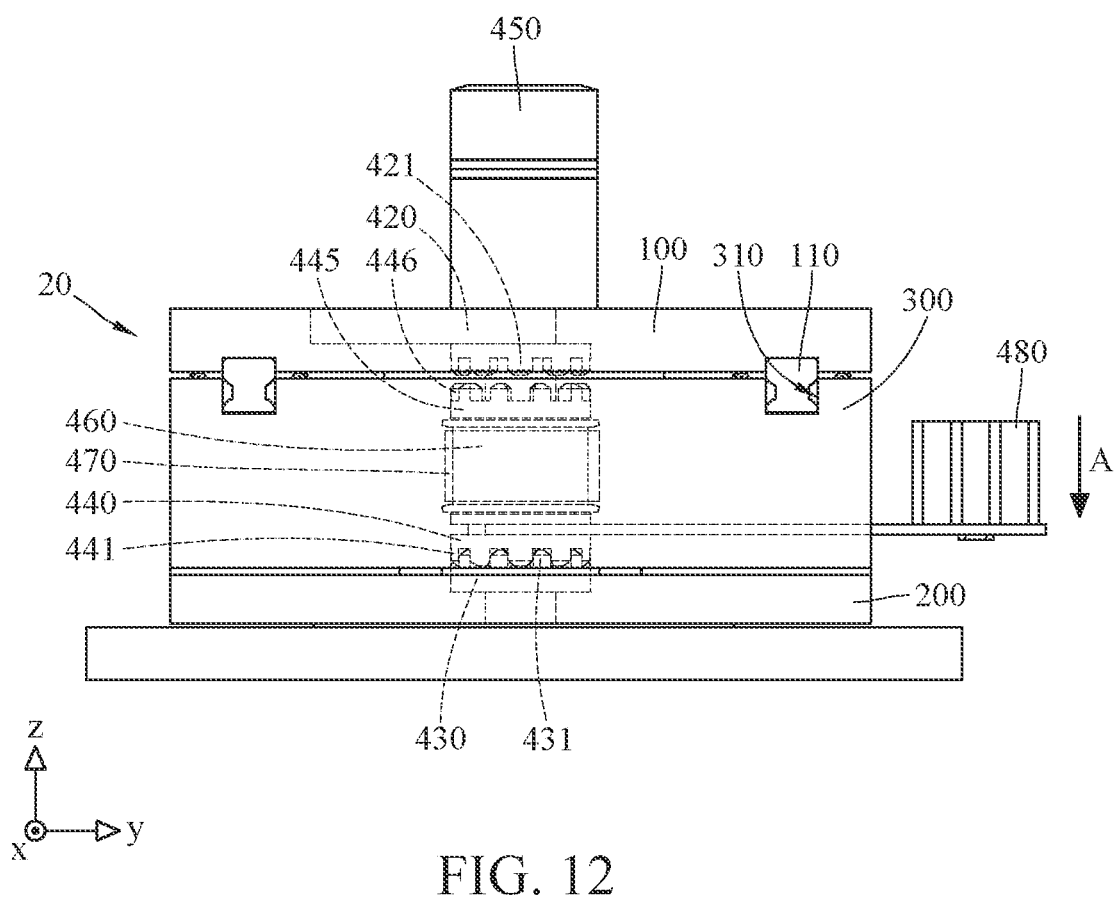
Figure 13:
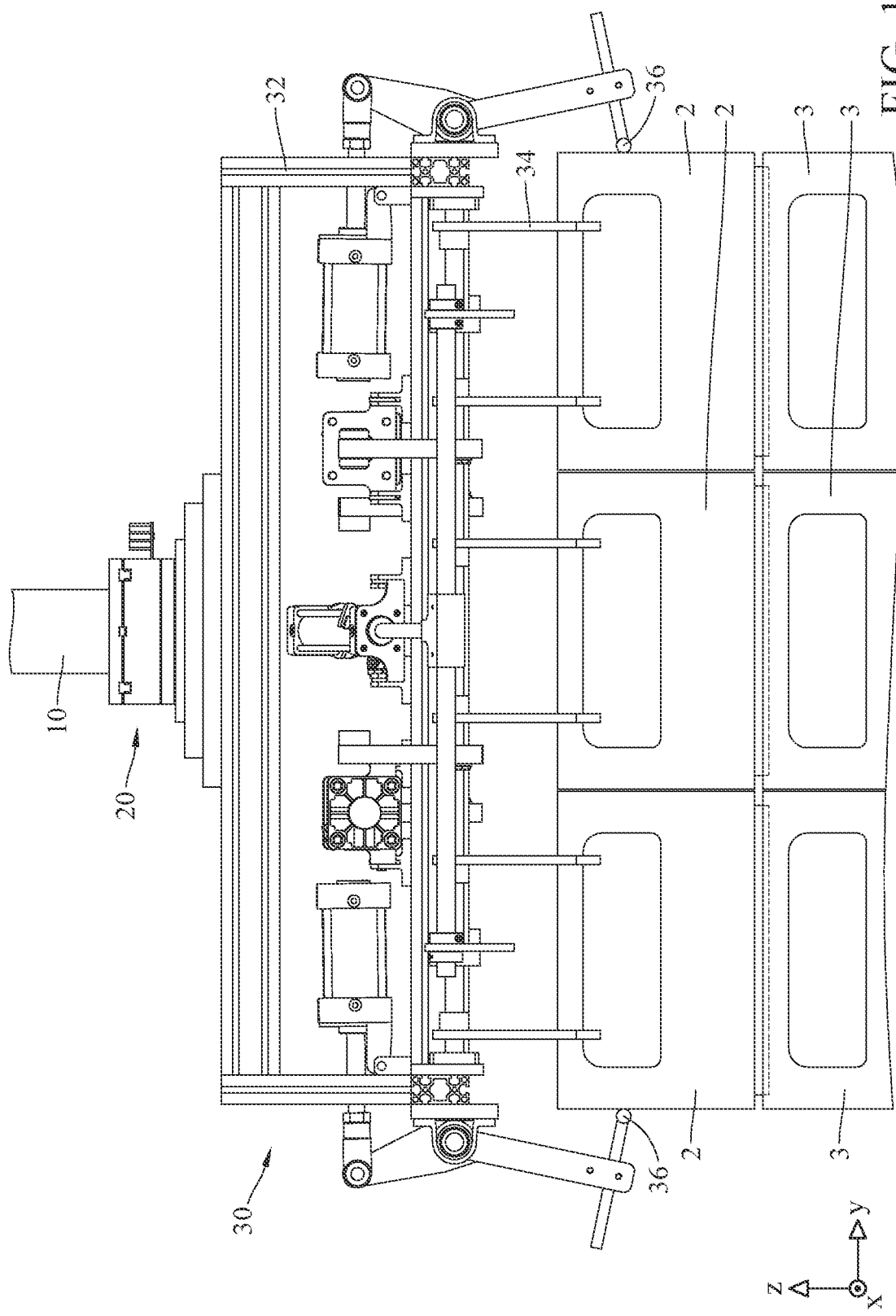
Figure 14:
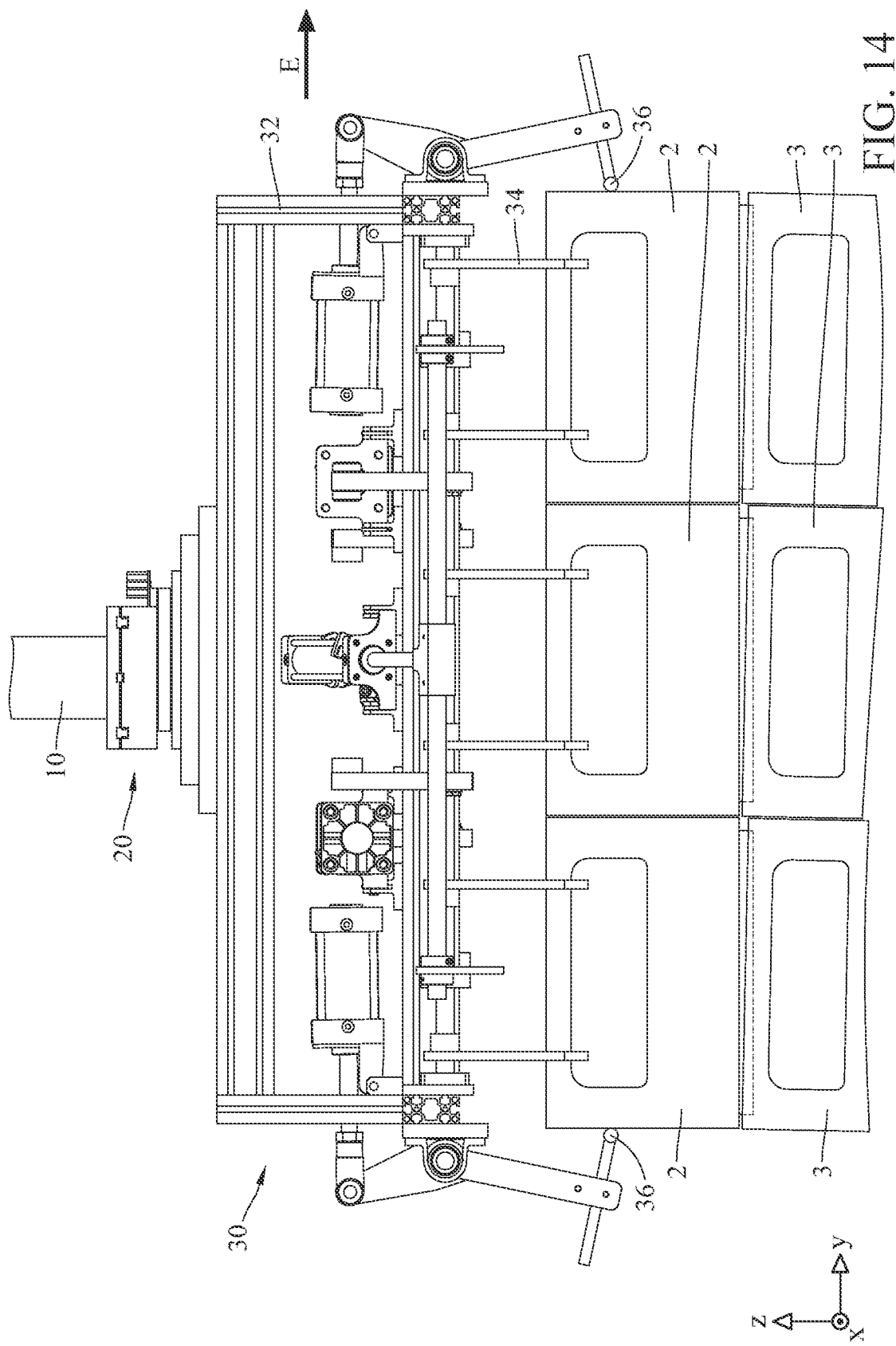

Then, as shown in FIGS. 12 to 14, the linear movement driving component 480 moves the clutches 440 and 445 along the direction A so as to engage the first engagement structure 441 of the clutch 440 with the second engagement structure 431 of the second pushing component 430. Therefore, when the rotation-driving component 450 rotates the clutch 440, the clutch 440 rotates the second pushing component 430 relative to the second coupling component 200, such that the second pushing component 430 moves the clamping mechanism 30 along a third direction (e.g., a direction E shown in FIG. 14). In this embodiment, the direction A is the negative Z-axis direction, and the direction E is the positive Y-axis direction.

Figure 15:
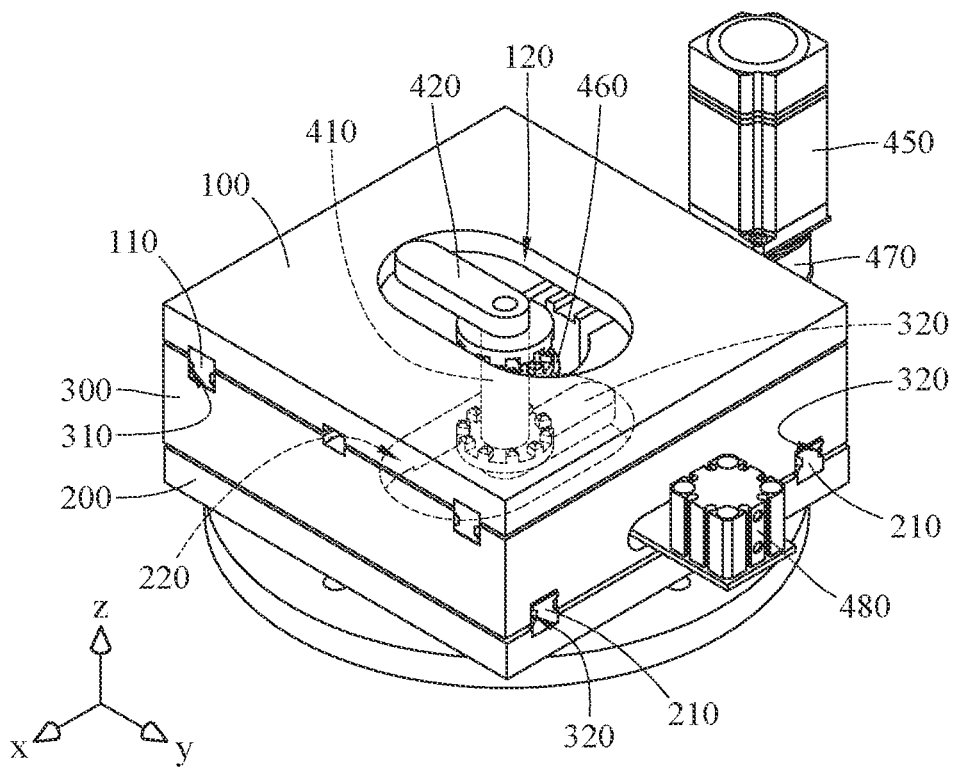
Figure 16:
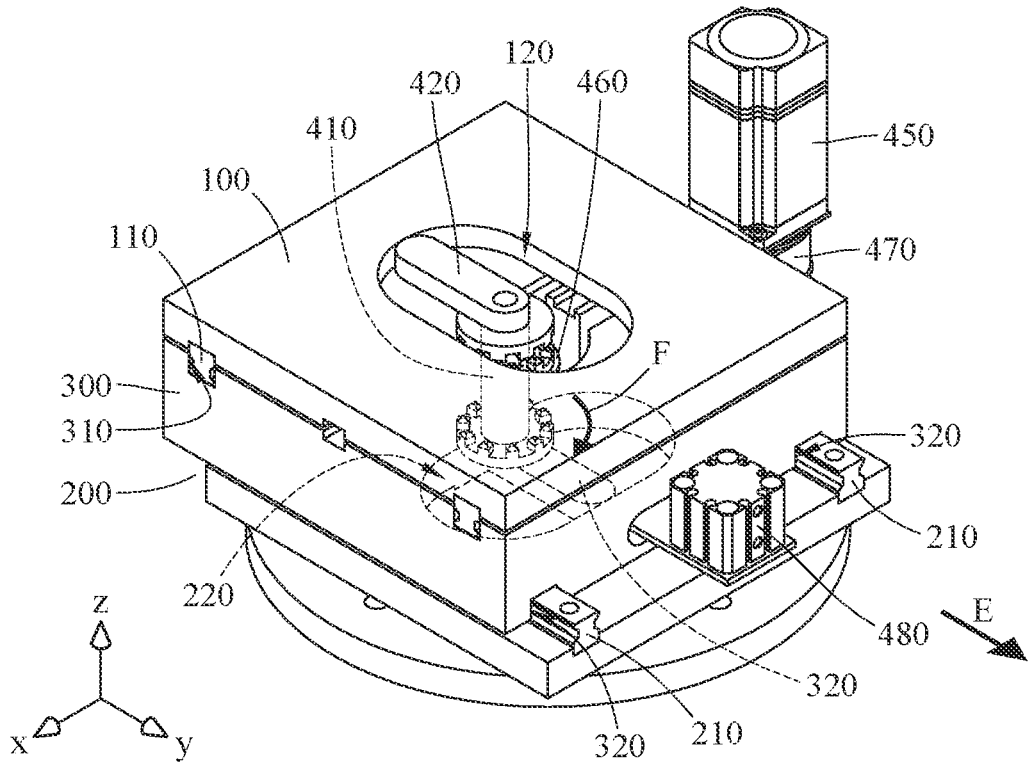
Figure 17:
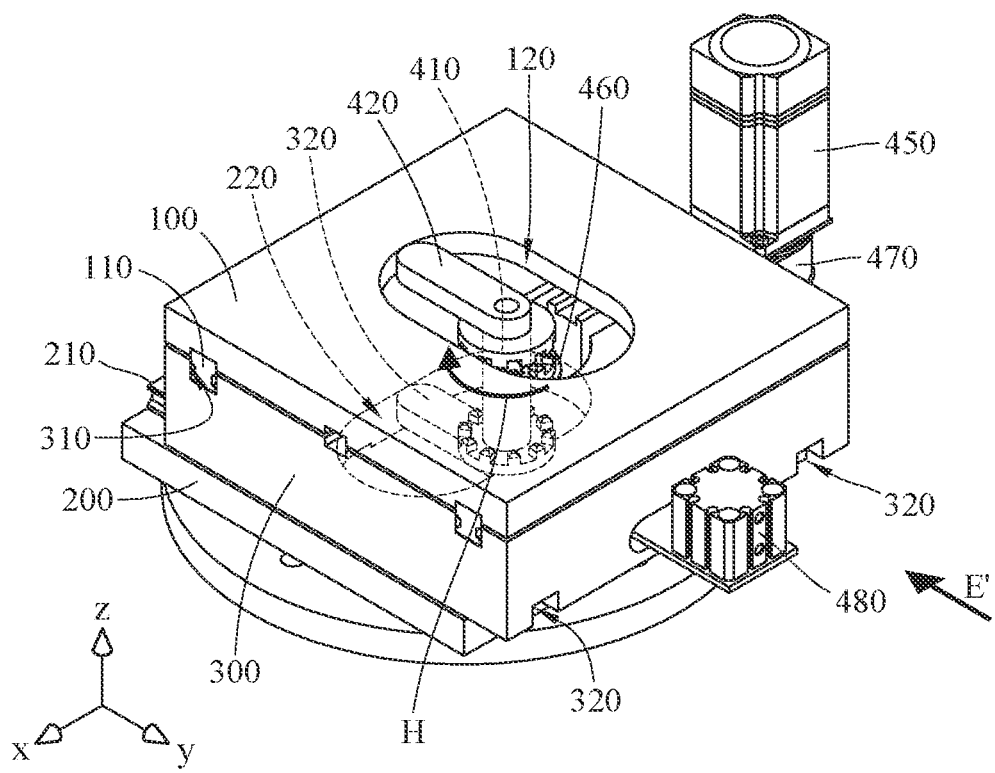
Figure 18:
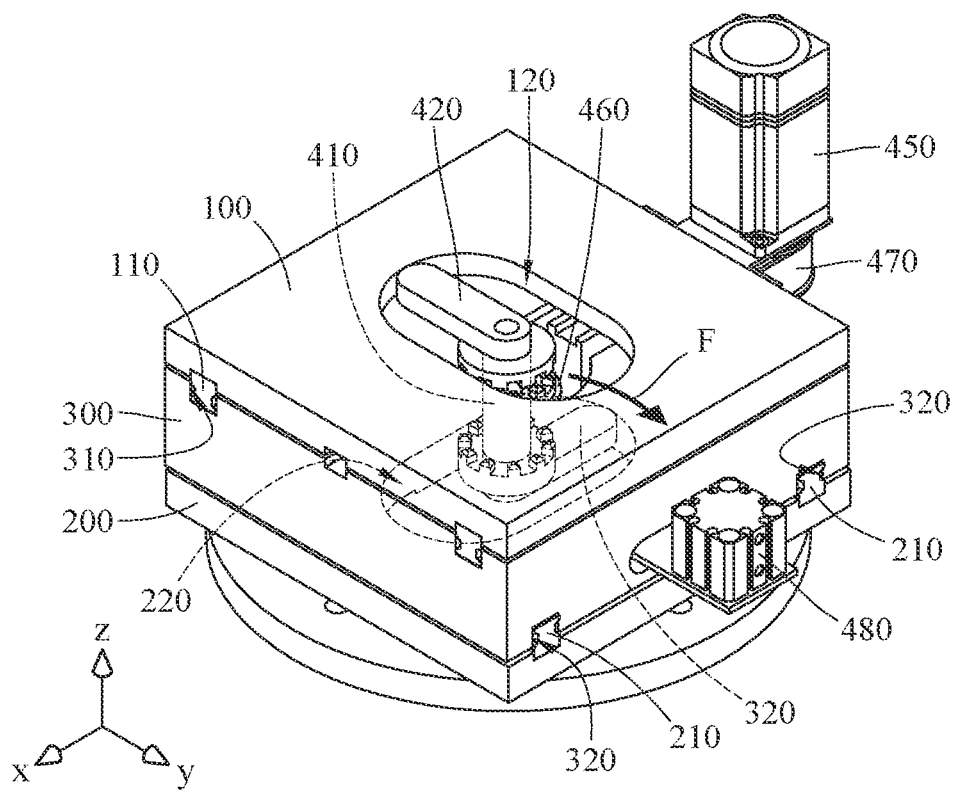

Then, the movement of the clamping mechanism 30 along the third direction (e.g., the direction E) will be introduced. As shown in FIGS. 15 and 16, the rotation-driving component 450 rotates the second pushing component 430 via the shaft 410 along a direction F, and the second coupling component 200 is pushed by the second pushing component 430 so as to move along the third direction (e.g., the direction E) relative to the base component 300. Then, as shown in FIG. 17, the rotation-driving component 450 keeps rotating the second pushing component 430 along the direction F, such that the second pushing component 430 forces the second coupling component 200 to move relative to the base component 300 along a direction (e.g., a direction E') opposite to the third direction. Then as shown in FIG. 18, the second pushing component 430 returns back to its original position (e.g., the same position as shown in FIG. 15), and the clamping mechanism 30 is forced to move back to its original position. In this embodiment, the direction E is the positive Y-axis direction, and the direction E' is the negative Y-axis direction.

Figure 19:
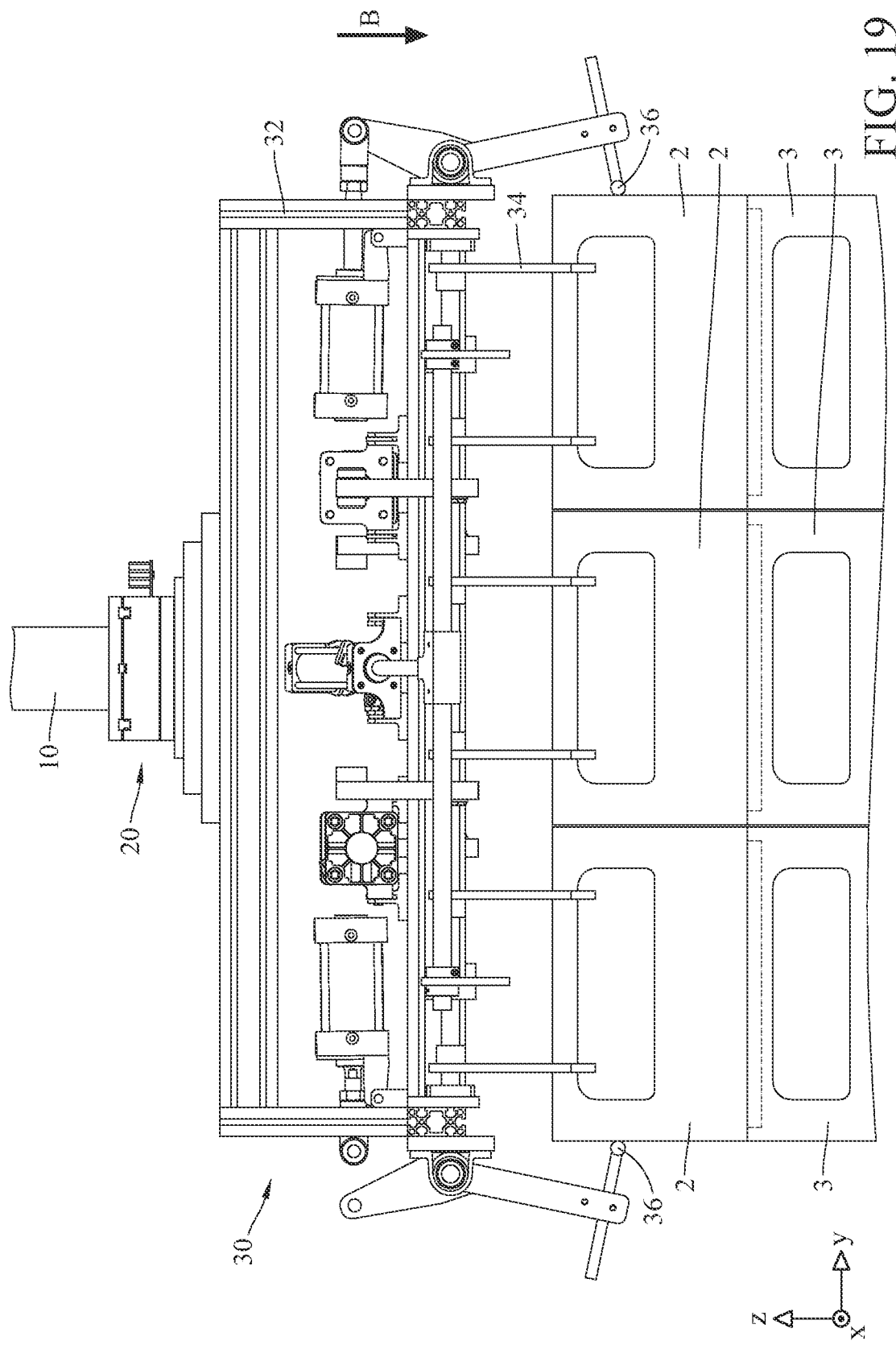

After the containers 2 are adjusted to be accurately aligned with and partially engaged with the containers 3 by the clamping mechanism 30, the movement mechanism 10 then forces the clamping mechanism 30 to move a second distance along the first direction (e.g., the direction B shown in FIG. 19). The sum of the first distance and the second distance is substantially equal to a depth that one of the container 2 and one of the container 3 are supposed to be fully-engaged with each other. Therefore, by moving the clamping mechanism 30 for the first distance and the second distance, the containers 2 and 3 can be respectively fully-engaged with each other.

Note that, in the operation method of the pick-and-place system 1, the steps of moving the clamping mechanism 30 along the second direction and the third direction can be modified to the step of moving the clamping mechanism 30 along a fourth direction, where the fourth direction may be parallel to the second direction or may be at an angle of 45 degrees to the second direction. That is, the operating method of the pick-and-place system includes picking up an object to the top of another object by the clamping mechanism, moving the clamping mechanism a first distance along a first direction which is shorter than a depth that these two objects are supposed to be fully-engaged with each other to partially engage the object with the another object, moving the clamping mechanism along a fourth direction perpendicular to the first direction so as to force the object to move the another object along the fourth direction, and moving the clamping mechanism a second distance along the first direction so as to make these two objects fully-engaged with each other, where the sum of the first distance and the second distance is substantially equal to the depth that these two objects are supposed to be fully-engaged with each other.

Moreover, the clamping mechanism 30 can pick up not only the containers 2 but also the pallet 4 or the beverage bottles 5. Referring to FIGS. 20 and 21, FIG. 20 shows the pick-and-place system 1 in FIG. 1 when picking up the pallet 4, and FIG. 21 is a schematic view of a pick-and-place system according to a second embodiment of the disclosure when picking up the beverage bottles 5. As shown in FIG. 20, the second movable hooks 38 of the clamping mechanism 30 are hooked on the pallet 4, and the pallet 4 can be moved by the movement mechanism 10 of the pick-and-place system 1. During the hooking process of the second movable hooks 38 on the pallet 4, there may an issue that the second movable hooks 38 are unable to accurately be hooked on the pallet 4 due to the damages of the pallet 4. In such a case, the positions of the second movable hooks 38 relative to the pallet 4 may be adjusted by the adjustment mechanism 20 for ensuring the second movable hooks 38 can firmly hooked on the pallet 4. On the other hand, as shown in FIG. 21, the clamping mechanism 30 can be modified to a clamping mechanism 30'. The clamping mechanism 30' includes a support 32' and a plurality of fastening sleeves 34'. The support 32' is fixed to the second coupling component 200, and the fastening sleeves 34' are disposed on the support 32' for picking up the beverage bottles 5, such that the beverage bottles 5 can be moved by the movement mechanism 10 of the pick-and-place system 1. For example, during the placement of the beverage bottles 5 into the container, there may be an issue that the beverage bottles 5 are unable to be accurately placed into the container. In such a case, the adjustment mechanism 20 can finely adjust the positions of the beverage bottles 5 relative to the container, such that the beverage bottles 5 can be accurately placed into the container by the pick-and-place system 1.

In one embodiment, the pick-and-place system 1 may further include a data storage (not shown), an image capturer (not shown), and a controller (not shown). The data storage is, for example, a hard disk drive having database for storing a plurality of sets of operation parameters. The image capturer is, for example, a camera for capturing an image or reading a patterned identification information. The controller is configured to drive the pick-and-place system 1 with one set of the operation parameters according to the image or the patterned identification information. For example, the database may store multiple sets of the operation parameters of the pick-and-place system 1 according to the broken pallet 4, the containers of different sizes, or different cases of the deformation of the containers.

Figure 22:
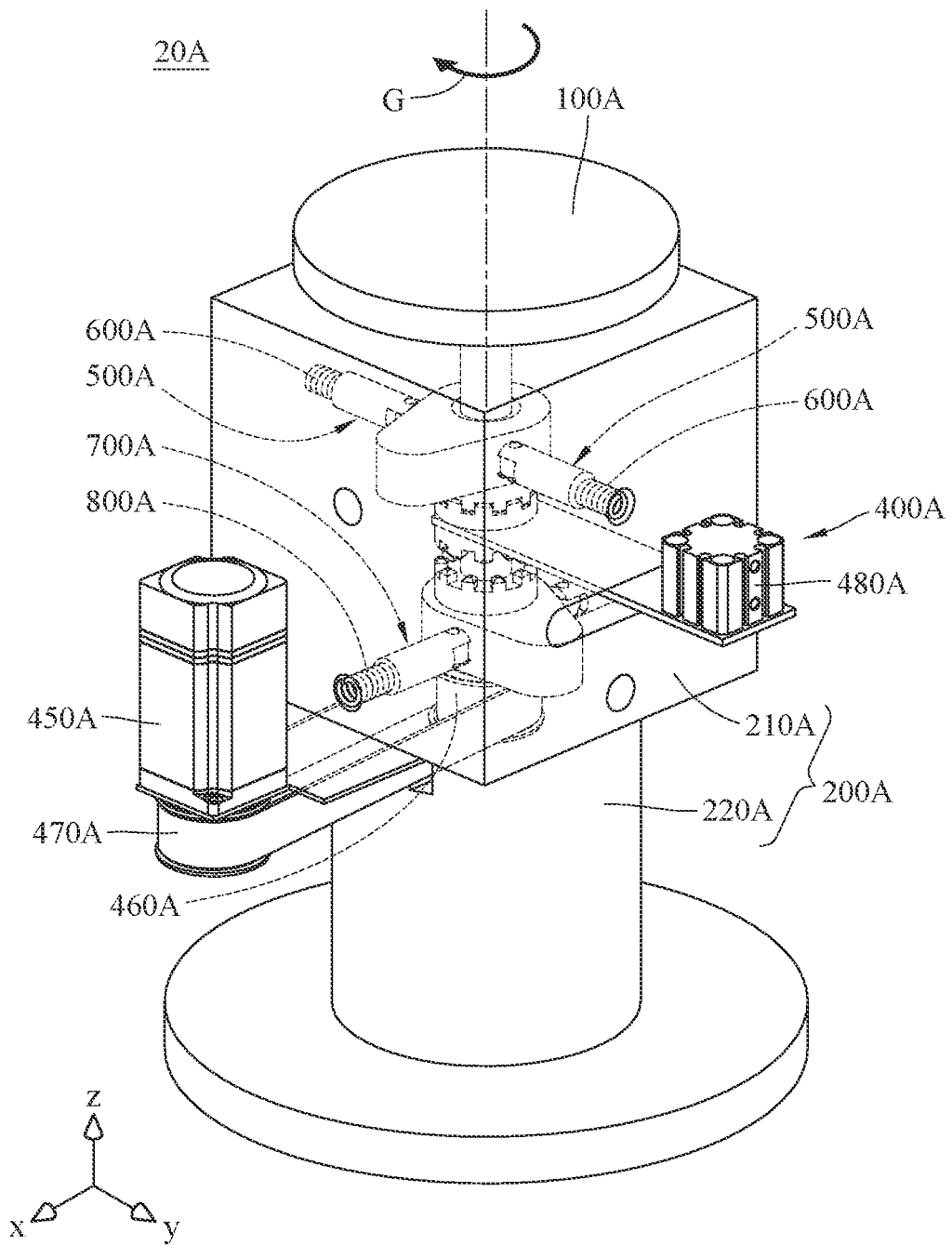
FIG. 22 is a perspective view of an adjustment mechanism according to third embodiment of the disclosure.
Figure 23:
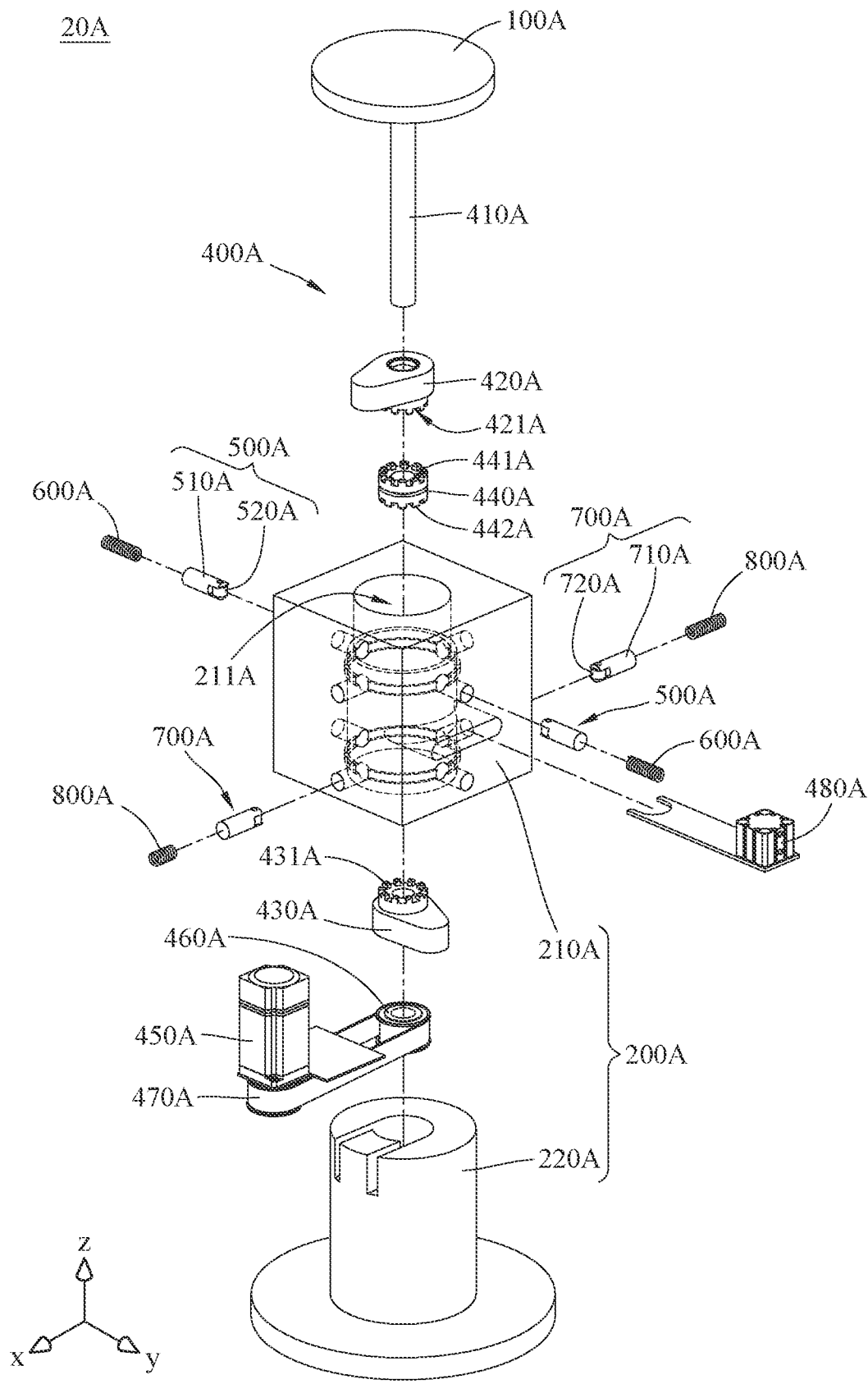
FIG. 23 is an exploded view of the adjustment mechanism in FIG. 22.
Figure 24:
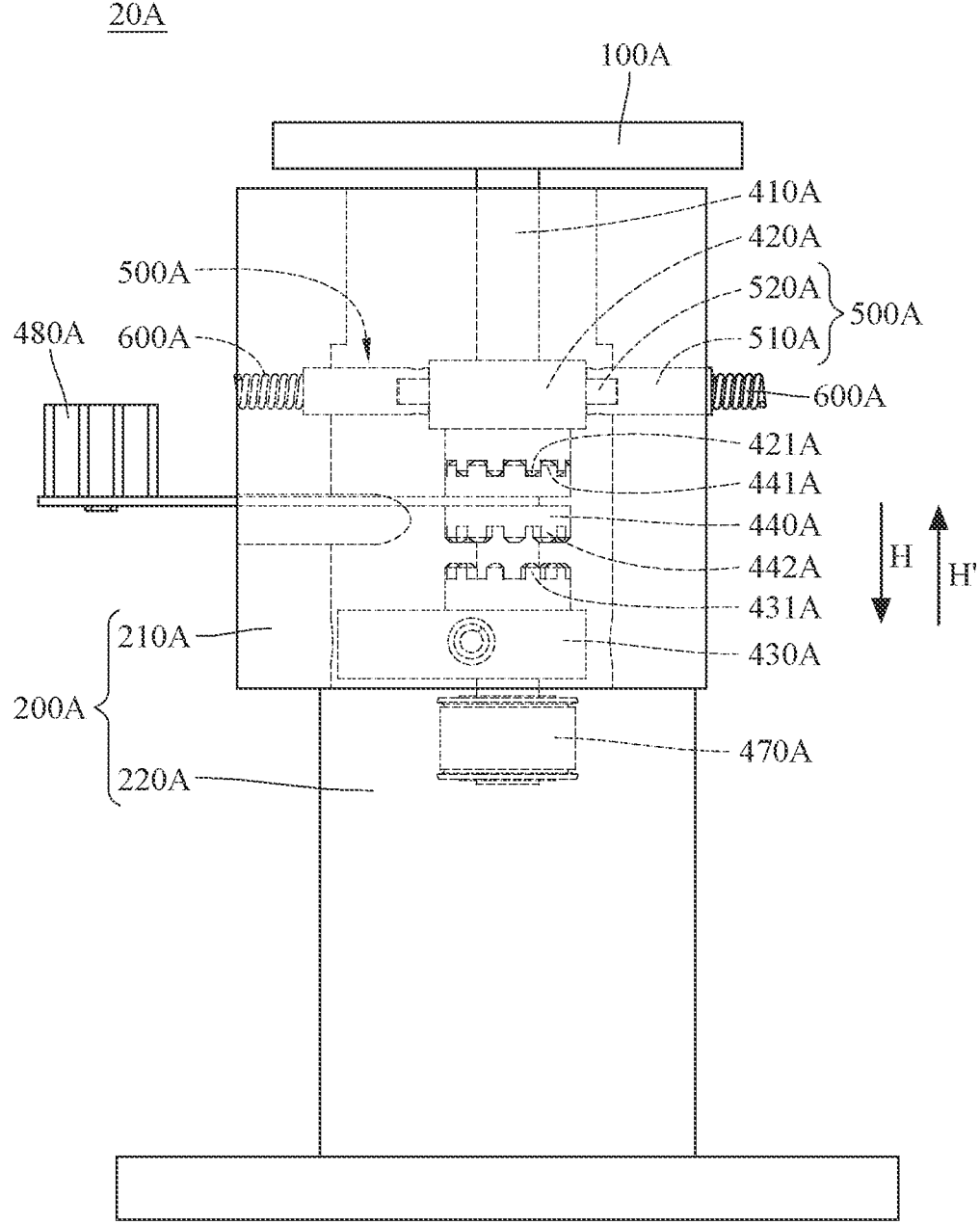
FIG. 24 is a side view of the adjustment mechanism in FIG. 22.

Referring to FIGS. 22 to 24, FIG. 22 is a perspective view of an adjustment mechanism 20A according to third embodiment of the disclosure, FIG. 23 is an exploded view of the adjustment mechanism 20A in FIG. 22, and FIG. 24 is a side view of the adjustment mechanism 20A in FIG. 22.

In this embodiment, the adjustment mechanism 20A includes a first coupling component 100A, a second coupling component 200A, and a driving assembly 400A. The first coupling component 100A is mounted on a movement mechanism (not shown) via, for example, screws, such that the first coupling component 100A can be moved along with the movement mechanism. The second coupling component 200A is movably disposed on the first coupling component 100A. Specifically, the second coupling component 200A includes a main body 210A and a seat body 220A assembled with each other. The main body 210A has a hole 211A. A cross section of the hole 211A is in an oval shape, and the purpose of the hole 211A will be introduced later.

In this embodiment, the driving assembly 400A may, for example, have a motor for driving the first coupling component 100A and the second coupling component 200A to move relative to each other. Specifically, the driving assembly includes a shaft 410A, a first pushing component 420A, a second pushing component 430A, a clutch 440A, a rotation-driving component 450A, a transmission wheel 460A, a transmission belt 470A, and a linear movement driving component 480A. The shaft 410A is rotatably disposed on the first coupling component 100A. The first pushing component 420A is fixed to one end of the shaft 410A and located in the hole 211A of the main body 210A of the second coupling component 200A. The first pushing component 420A is, for example, a cam, and the first pushing component 420A and the shaft 410A are eccentric with each other. The second pushing component 430A is fixed to another end of the shaft 410A and located in the hole 211A of the main body 210A of the second coupling component 200A. The second pushing component 430A is, for example, a cam, and the second pushing component 430A and the shaft 410A are eccentric with each other. An extension direction of the second pushing component 430A is different from an extension direction of the first pushing component 420A.

As shown in FIG. 23, the clutch 440A has a first top engagement structure 441A and a first bottom engagement structure 442A located at two opposite sides of the clutch 440A. The first pushing component 420A has a second top engagement structure 421A, and the second pushing component 430A has a second bottom engagement structure 431A. The clutch 440A is slidably disposed on the shaft 410A and is slidable along a direction H or H'. The clutch 440A is rotatable with the shaft 410A so as to be rotatable relative to the first coupling component 100A. When the first top engagement structure 441A of the clutch 440A is engaged with the second top engagement structure 421A of the first pushing component 420A, the shaft 410A rotates the first pushing component 420A relative to the second coupling component 200A via the clutch 440A. When the first bottom engagement structure 442A of the clutch 440A is engaged with the second bottom engagement structure 431A of the second pushing component 430A, the shaft 410A rotates the second pushing component 430A relative to the second coupling component 200A via the clutch 440A. In this embodiment, the direction H is the negative Z-axis direction, and the direction H' is the negative Z-axis direction.

The transmission wheel 460A is fixed to the shaft 410A. The rotation-driving component 450A is, for example, a motor. The transmission belt 470A is sleeved on an output wheel of the rotation-driving component 450A and the transmission wheel 460A, such that the rotation-driving component 450A can drive the shaft 410A to rotate relative to the second coupling component 200A along a direction G via the transmission belt 470A and the transmission wheel 460A.

The linear movement driving component 480A is, for example, a pneumatic cylinder. The linear movement driving component 480A is connected to the clutch 440A for moving the clutch 440A along an axis of the shaft 410A (e.g., the direction H or H') to engage the first top engagement structure 441A of the clutch 440A with the second top engagement structure 421A of the first pushing component 420A or engage the first bottom engagement structure 442A of the clutch 440A with the second bottom engagement structure 431A of the second pushing component 430A. When the first top engagement structure 441A of the clutch 440A is engaged with the second top engagement structure 421A, the first pushing component 420A is rotated along with the shaft 410A and in contact with an inner surface of the main body 210A of the second coupling component 200A surrounding the hole 211A so as to move the second coupling component 200A relative to the first coupling component 100A along X-axis direction. When the first bottom engagement structure 442A of the clutch 440A is engaged with the second bottom engagement structure 422A, the second pushing component 430A is rotated along with the shaft 410A and in contact with the inner surface of the main body 210A of the second coupling component 200A surrounding the hole 211A so as to move the second coupling component 200A relative to the first coupling component 100A along Y-axis direction.

In one embodiment, the adjustment mechanism 20A may further include two sets of first pressing components 500A and first elastic components 600A and two sets of second pressing components 700A and second elastic components 800A. Two sets of the first pressing components 500A and the first elastic components 600A are respectively in contact with two opposite sides of the first pushing component 420A, and two sets of the second pressing components 700A and the second elastic components 800A are respectively in contact with two opposite sides of the second pushing component 430A for positioning the second coupling component 200A in a certain angle, such as 5 or 10 degrees.

For the purpose of illustration, the following will introduce one set of the two sets of the first pressing components 500A and the first elastic components 600A and one set of the two sets of the second pressing components 700A and the second elastic components 800A. The first pressing component 500A is slidably disposed on the second coupling component 200A. One end of the first elastic component 600A is connected to the second coupling component 200A, and another end of the first elastic component 600A is connected to the first pressing component 500A, such that the first pressing component 500A presses against the first pushing component 420A. The second pressing component 700A is slidably disposed on the second coupling component 200A. One end of the second elastic component 800A is connected to the second coupling component 200A, and another ends of the second elastic component 800A is connected to the second pressing component 700A, such that the second pressing component 700A presses against the second pushing component 430A.

As shown in FIG. 23, in one embodiment, the first pressing component 500A includes a first main body 510A and a first rotatable body 520A. The first main body 510A is slidably disposed on the second coupling component 200A. One end of the first elastic component 600A is connected to the second coupling component 200A, and another end of the first elastic component 600A is connected to the first main body 510A. The first rotatable body 520A is rotatably disposed on the first main body 510A and in contact with one side of the first pushing component 420A. The second pressing component 700A includes a second main body 710A and a second rotatable body 720A. The second main body 710A is slidably disposed on the second coupling component 200A. One end of the second elastic component 800A is connected to the second coupling component 200A, and another end of the second elastic component 800A is connected to the second main body 710A. The second rotatable body 720A is rotatably disposed on the second main body 710A and in contact with one side of the second pushing component 430A.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A pick-and-place system, comprising:
   a movement mechanism;
   an adjustment mechanism, comprising:
      a first coupling component, mounted on the movement mechanism;
      a second coupling component, movably disposed on the first coupling component; and
      a driving assembly, configured to be connected to the first coupling component and the second coupling component so as to force the first coupling component and the second coupling component to move relative to each other; and
   a clamping mechanism, mounted on the second coupling component of the adjustment mechanism;
   wherein the driving assembly comprises:
      a shaft, rotatably disposed on the first coupling component;
      a first pushing component, rotatable with the shaft and in contact with the first coupling component or the second coupling component for forcing the first coupling component and the second coupling component to move relative to each other; and
      a rotation-driving component, connected to the shaft and configured to rotate the shaft relative to the first coupling component.

2. The pick-and-place system according to claim 1, wherein the adjustment mechanism further comprises a second pushing component, a clutch, and a linear movement driving component; the second pushing component is rotatable with the shaft, the first pushing component and the second pushing component are both in contact with the second coupling component for forcing the first coupling component and the second coupling component to move relative to each other; the clutch is slidably disposed on the shaft and is rotatable with the shaft so as to be rotatable relative to the first coupling component; the linear movement driving component is connected to the clutch for sliding the clutch along an axis of the shaft to be engaged with the first pushing component or the second pushing component; when the clutch is engaged with the first pushing component, the shaft rotates the first pushing component relative to the second coupling component via the clutch; and when the clutch is engaged with the second pushing component, the shaft rotates the second pushing component relative to the second coupling component via the clutch.

3. The pick-and-place system according to claim 2, wherein the clutch has a first top engagement structure and a first bottom engagement structure located at two opposite sides of the clutch, the first pushing component has a second top engagement structure, the second pushing component has a second bottom engagement structure; when the clutch is engaged with the first pushing component, the first top engagement structure of the clutch is engaged with the second top engagement structure of the first pushing component, such that the shaft rotates the first pushing component relative to the second coupling component via the clutch; and when the clutch is engaged with the second pushing component, the first bottom engagement structure of the clutch is engaged with the second bottom engagement structure of the second pushing component, such that the shaft rotates the second pushing component relative to the second coupling component via the clutch.

4. The pick-and-place system according to claim 2, wherein the adjustment mechanism further comprises at least one first pressing component, at least one first elastic component, at least one second pressing component, and at least one second elastic component, the at least one first pressing component is slidably disposed on the second coupling component, one end of the at least one first elastic component is connected to the second coupling component, another end of the at least one first elastic component is connected to the at least one first pressing component, the at least one first pressing component presses against the first pushing component, the at least one second pressing component is slidably disposed on the second coupling component, one end of the at least one second elastic component is connected to the second coupling component, another end of the at least one second elastic component is connected to the at least one second pressing component, and the at least one second pressing component presses against the second pushing component.

5. The pick-and-place system according to claim 4, wherein the at least one first pressing component comprises a first main body and a first rotatable body, the first main body is slidably disposed on the second coupling component, one end of the first elastic component is connected to the second coupling component, another end of the first elastic component is connected to the first main body, the first rotatable body is rotatably disposed on the first main body and in contact with one side of the first pushing component, the at least one second pressing component comprises a second main body and a second rotatable body, the second main body is slidably disposed on the second coupling component, one end of the second elastic component is connected to the second coupling component, another end of the second elastic component is connected to the second main body, and the second rotatable body is rotatably disposed on the second main body and in contact with one side of the second pushing component.

6. The pick-and-place system according to claim 4, wherein the at least one first pressing component comprises two first pressing components, the at least one second pressing component comprises two second pressing components, the first pressing components are respectively in contact with two opposite sides of the first pushing component, and the second pressing components are respectively in contact with two opposite sides of the second pushing component.

7. The pick-and-place system according to claim 1, wherein the adjustment mechanism further comprises a base component, the base component is slidably disposed on the first coupling component, the second coupling component is slidably disposed on the base component, a slidable direction of the base component relative to the first coupling component is different from a slidable direction of the second coupling component relative to the base component, the first pushing component is rotatable with the shaft and in contact with the first coupling component for forcing the first coupling component and the base component to slide relative to each other, the driving assembly further comprises a second pushing component, the second pushing component is rotatable with the shaft and in contact with the second coupling component for forcing the second coupling component and the base component to slide relative to each other.

8. The pick-and-place system according to claim 7, wherein the adjustment mechanism further comprises two clutches and a linear movement driving component, the clutches are slidably disposed on the shaft and rotatable with the shaft so as to be rotatable relative to the first coupling component, the linear movement driving component is connected to the clutches for moving the clutches along an axis of the shaft to engage one of the clutches with the first pushing component or the second pushing component; when one of the clutches is engaged with the first pushing component, the shaft rotates the first pushing component relative to the first coupling component via the one of the clutches; and when the other one of the clutches is engaged with the second pushing component, the shaft rotates the second pushing component relative to the second coupling component via the other one of the clutches.

9. The pick-and-place system according to claim 8, wherein each of the clutches has a first engagement structure, each of the first pushing component and the second pushing component has a second engagement structure; when the one of the clutches is engaged with the first pushing component, the first engagement structure of the one of the clutches is engaged with the second engagement structure of the first pushing component, such that the shaft rotates the first pushing component relative to the first coupling component via the one of the clutches; and when the other one of the clutches is engaged with the second pushing component, the first engagement structure of the other one of the clutches is engaged with the second engagement structure of the second pushing component, such that the shaft rotates the second pushing component relative to the second coupling component via the other one of the clutches.

10. The pick-and-place system according to claim 1, wherein the clamping mechanism comprises a support and a plurality of first movable hooks, the support is fixed to the second coupling component, and the plurality of first movable hooks are pivotably disposed on the support.

11. The pick-and-place system according to claim 10, wherein the clamping mechanism further comprises a plurality of second movable hooks, the plurality of second movable hooks are pivotably disposed on the support, and a length of each of the plurality of second movable hooks is larger than a length of each of the plurality of first movable hooks.

12. The pick-and-place system according to claim 1, wherein the clamping mechanism comprises a support and a plurality of fastening sleeves, the support is fixed to the second coupling component, and the plurality of fastening sleeves are disposed on the support.

13. The pick-and-place system according to claim 1, further comprising a data storage, an image capturer, and a controller electrically connected to each other, wherein the data storage is configured to store a plurality of sets of operation parameters, the image capturer is configured to capture an image or read a patterned identification information, and the controller is configured to drive the pick-and-place system with one of the plurality of sets of operation parameters according to the image or the patterned identification information.

14. An adjustment mechanism, configured to be mounted on a movement mechanism, comprising:

a first coupling component, configured to be mounted on the movement mechanism;
    a second coupling component, movably disposed on the first coupling component; and
    a driving assembly, comprising:
        a shaft, rotatably disposed on the first coupling component;
        a first pushing component, rotatable with the shaft and in contact with the first coupling component or the second coupling component for forcing the first coupling component and the second coupling component to move relative to each other; and
        a rotation-driving component, connected to the shaft and configured to rotate the shaft relative to the first coupling component.

15. The adjustment mechanism according to claim 14, further comprising a second pushing component, a clutch, and a linear movement driving component, wherein the second pushing component is movable with the shaft, the first pushing component and the second pushing component are both in contact with the first coupling component for forcing the first coupling component and the second coupling component to move relative to each other, the clutch is slidably disposed on the shaft and is rotatable with the shaft so as to be rotatable relative to the first coupling component, the linear movement driving component is connected to the clutch for sliding the clutch along an axis of the shaft to be engaged with or detached from the second pushing component; and when the clutch is engaged with the second pushing component, the shaft rotates the second pushing component relative to the second coupling component via the clutch.

16. The adjustment mechanism according to claim 14, further comprising a base component, wherein the base component is slidably disposed on the first coupling component, the second coupling component is slidably disposed on the base component, a slidable direction of the base component relative to the first coupling component is different from a slidable direction of the second coupling component relative to the base component, the first pushing component is rotatable with the shaft and in contact with the first coupling component for forcing the first coupling component and the base component to slide relative to each other, the driving assembly further comprises a second pushing component, the second pushing component is rotatable with the shaft and in contact with the second coupling component for forcing the second coupling component and the base component to slide relative to each other.

17. The adjustment mechanism according to claim 16, further comprising two clutches and a linear movement driving component, wherein the clutches are slidably disposed on the shaft and is rotatable with the shaft so as to be rotatable relative to the first coupling component, the linear movement driving component is connected to the clutches for moving the clutches along an axis of the shaft to engage one of the clutches with the first pushing component or the second pushing component; when one of the clutches is engaged with the first pushing component, the shaft rotates the first pushing component relative to the first coupling component via the one of the clutches; and when the other one of the clutches is engaged with the second pushing component, the shaft rotates the second pushing component relative to the second coupling component via the other one of the clutches.

18. An operating method of a pick-and-place system, comprising:

using a clamping mechanism to pick up an object to a top of another object;

moving the clamping mechanism a first distance along a first direction to partially engage the object with the another object, wherein the first distance is smaller than a depth that the object is fully-engaged with the another object;

moving the clamping mechanism along a second direction which is perpendicular to the first direction to force the object to move the another object along the second direction; and moving the clamping mechanism a second distance along the first direction to fully-engage the object with the another object, wherein a sum of the first distance and the second distance is substantially equal to the depth that the object is fully-engaged with the another object.

19. The operating method according to claim 18, wherein after moving the clamping mechanism along the second direction to force the object to move the another object along the second direction, the operating method further comprises:

moving the clamping mechanism along a third direction which is perpendicular to the first direction and the second direction to force the object to move the another object along the third direction.

* * * * *